US012438719B2

(12) United States Patent
Nyamwange

(10) Patent No.: US 12,438,719 B2
(45) Date of Patent: Oct. 7, 2025

(54) AUTOMATICALLY RE-ROUTING MULTI-CLOUD HOLOCHAIN DATA INGESTION BASED ON NETWORK ARCHITECTURE AVAILABILITY TO INTERNET OF THINGS (IoT) DEVICES

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

(*) Notice: Subject to any disclaimer, the term of this patent is extended or adjusted under 35 U.S.C. 154(b) by 870 days.

(21) Appl. No.: 17/547,918

(22) Filed: Dec. 10, 2021

(65) Prior Publication Data
US 2023/0188344 A1 Jun. 15, 2023

(51) Int. Cl.
*H04L 9/32* (2006.01)
*G06F 3/06* (2006.01)

(52) U.S. Cl.
CPC ............. *H04L 9/32* (2013.01); *G06F 3/0623* (2013.01); *G06F 3/0626* (2013.01); *G06F 3/0655* (2013.01); *G06F 3/067* (2013.01)

(58) Field of Classification Search
CPC ....... H04L 9/32; G06F 3/0623; G06F 3/0626; G06F 3/0655; G06F 3/067
USPC ...................................................... 713/168
See application file for complete search history.

(56) References Cited

U.S. PATENT DOCUMENTS

| 8,799,413 | B2 * | 8/2014 | Taylor ................. G06F 11/2089 709/219 |
| 10,333,979 | B1 * | 6/2019 | Stickle ................ H04L 63/0807 |
| 11,487,665 | B2 * | 11/2022 | Thomasson ........... G06F 3/0656 |
| 2014/0325151 | A1 * | 10/2014 | Kim ....................... G06F 16/185 711/117 |
| 2017/0147614 | A1 * | 5/2017 | Hong ..................... G16B 50/00 |
| 2018/0338280 | A1 * | 11/2018 | Zakaria ................... H04W 4/80 |
| 2019/0045010 | A1 * | 2/2019 | Ha ......................... G06F 3/0664 |
| 2019/0205317 | A1 * | 7/2019 | Tobias ................... G06F 40/174 |
| 2019/0250899 | A1 * | 8/2019 | Riedl ..................... H04L 9/0825 |
| 2020/0257815 | A1 * | 8/2020 | Huang ................ H04L 63/0428 |
| 2020/0409571 | A1 * | 12/2020 | Saad ..................... G06F 3/0622 |
| 2020/0409798 | A1 | 12/2020 | Chen et al. |
| 2021/0089676 | A1 * | 3/2021 | Ford ..................... H04L 9/0825 |
| 2021/0096936 | A1 * | 4/2021 | Seshadri ............. G06F 9/30079 |
| 2021/0152545 | A1 * | 5/2021 | Park ..................... H04L 9/3268 |

* cited by examiner

*Primary Examiner* — Dereena T Cattungal
(74) *Attorney, Agent, or Firm* — Banner & Witcoff, Ltd.

(57) ABSTRACT

Aspects of the disclosure relate to automatically re-routing multi-cloud holochain data ingestion based on network architecture availability for internet of things (IoT) devices. A computing platform may request information that describes each cloud computing environment of a multi-cloud computing environment to identify the cloud computing environment that may store consumer data. The computing platform may compare the information that describes each cloud computing environment to an enterprise organization's preferences for selecting a cloud computing environment. The cloud computing platform may validate the consumer data and may encrypt the consumer data using public and private key pairs. The computing platform may transmit the encrypted consumer data to the cloud computing environment that satisfies the enterprise organization's preferences.

20 Claims, 16 Drawing Sheets

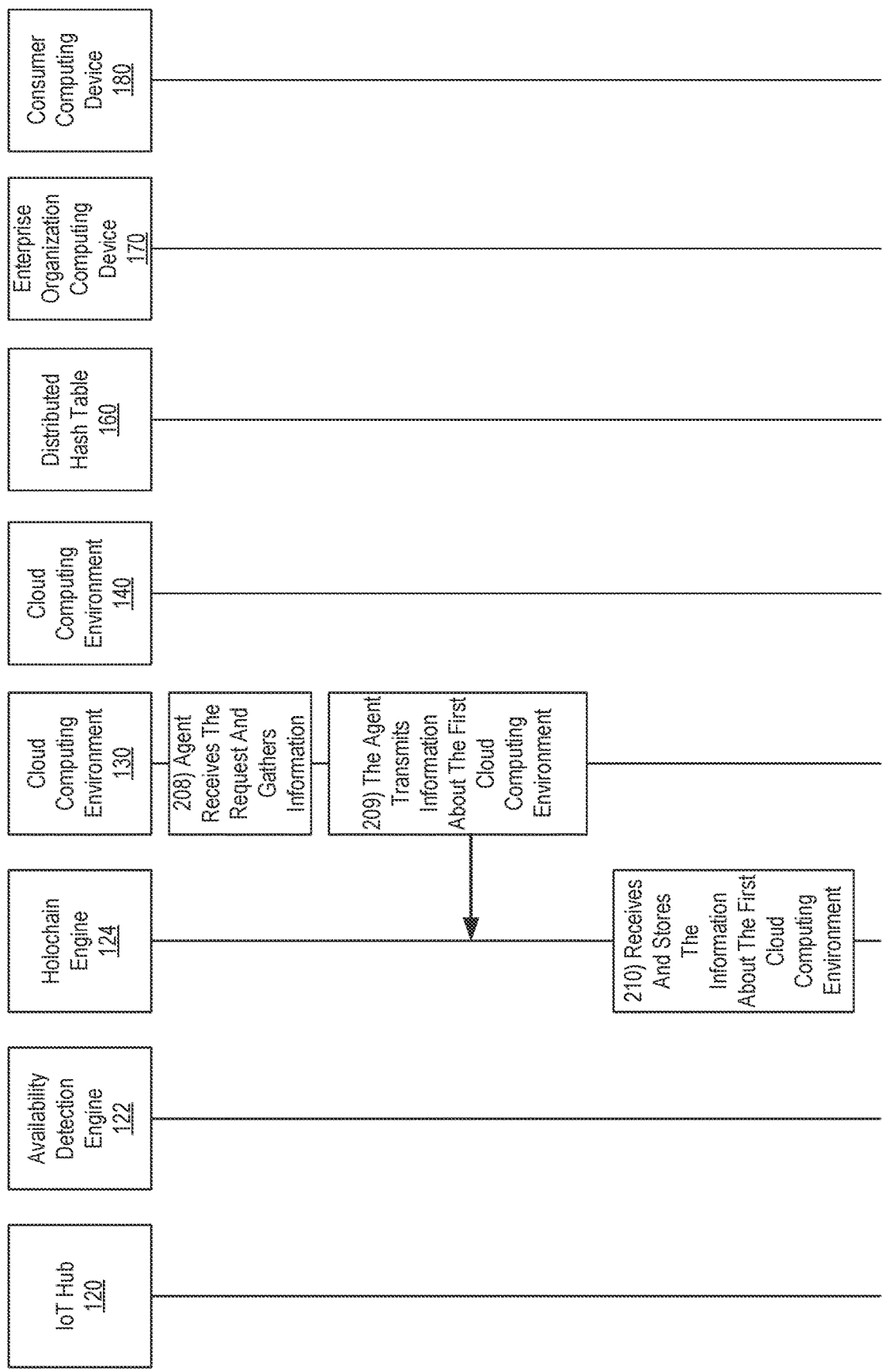

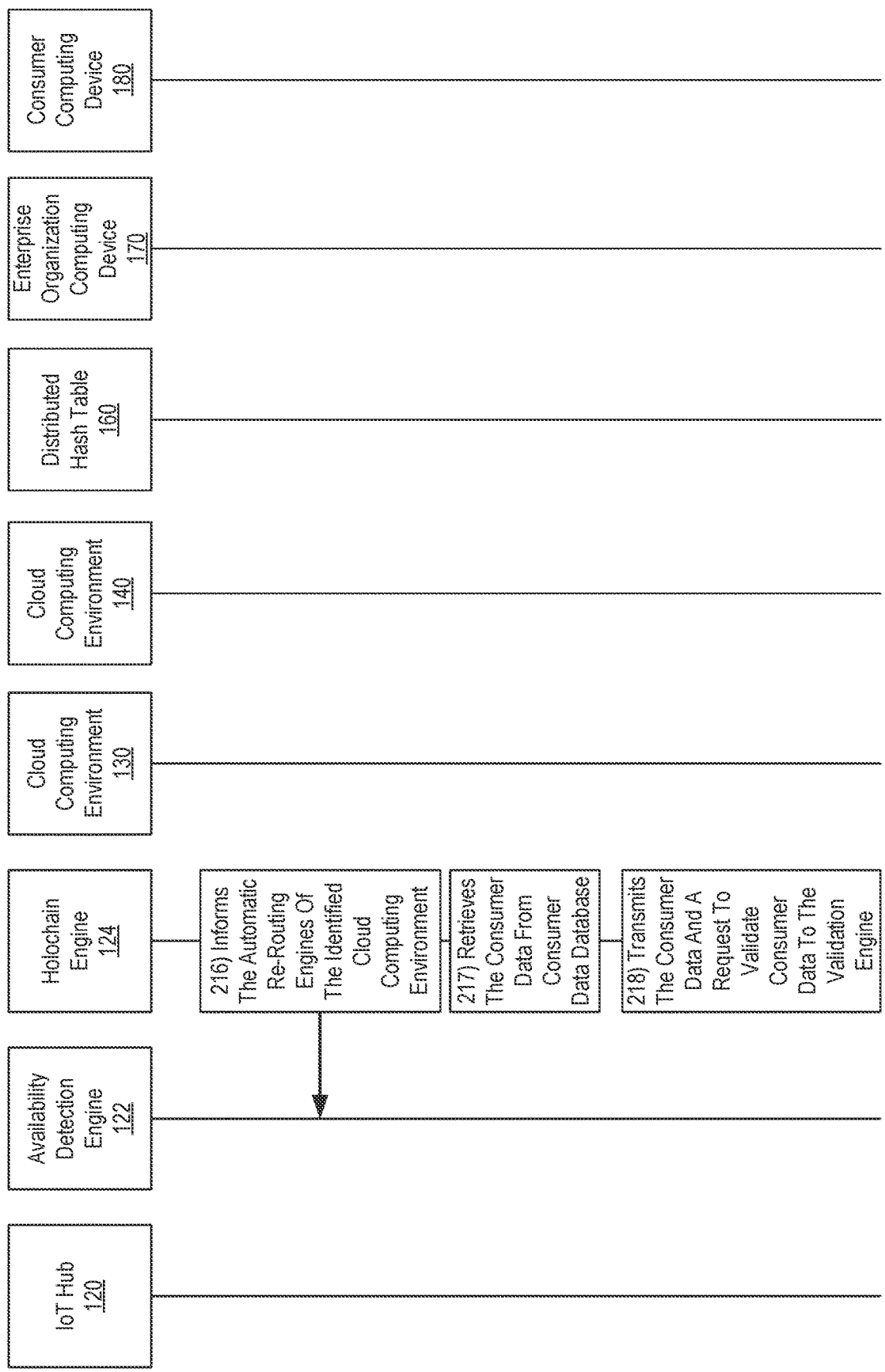

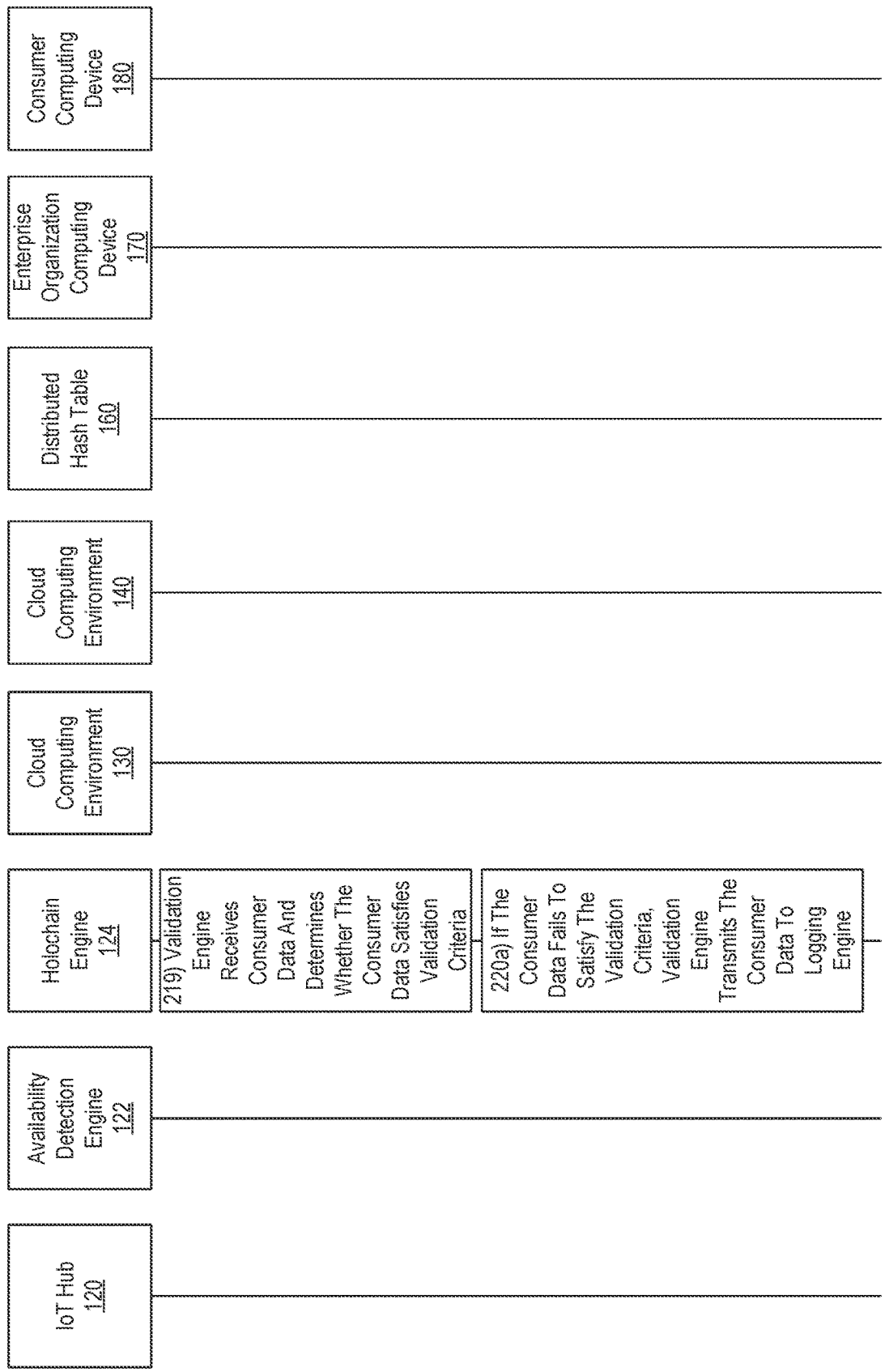

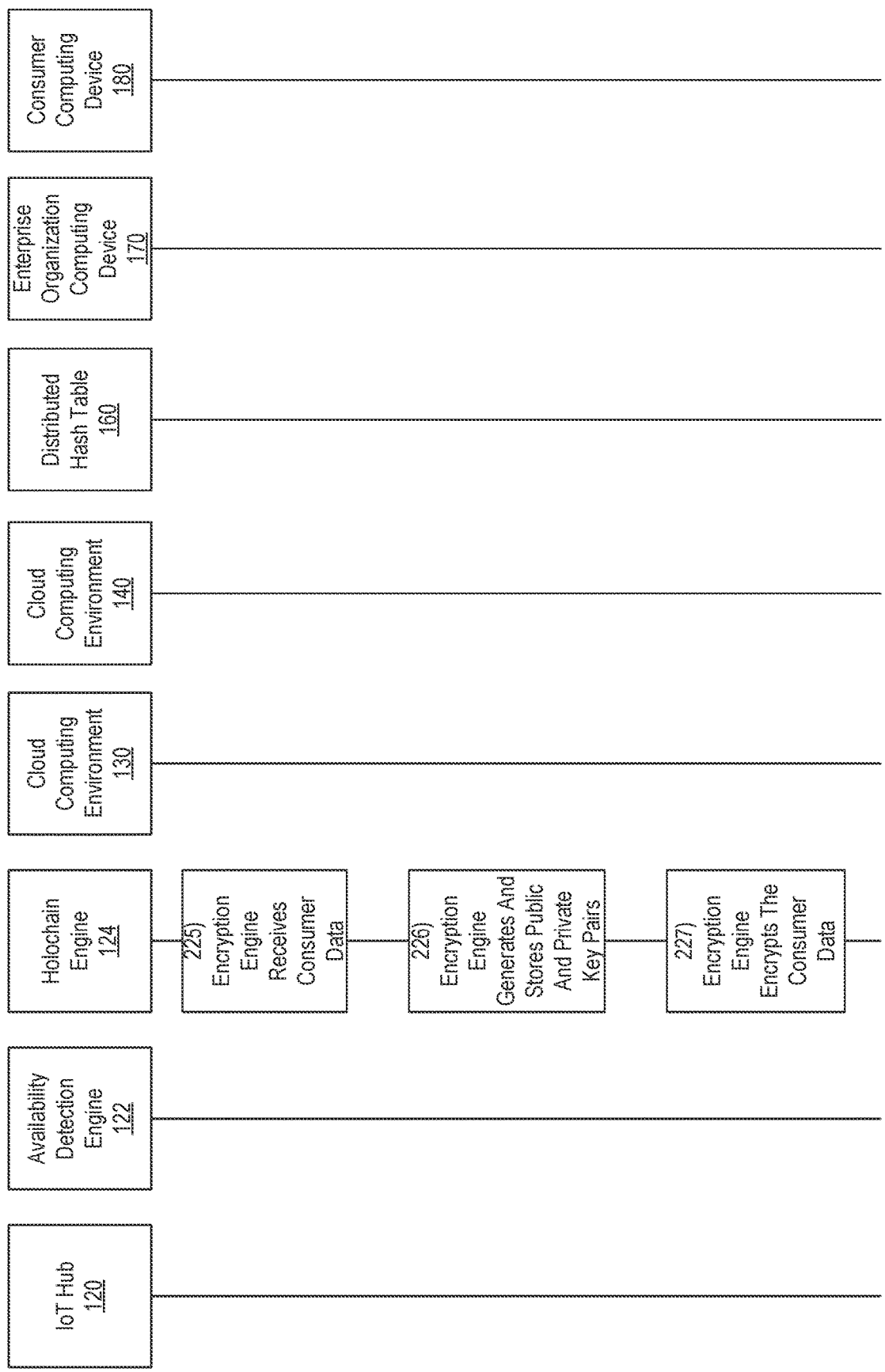

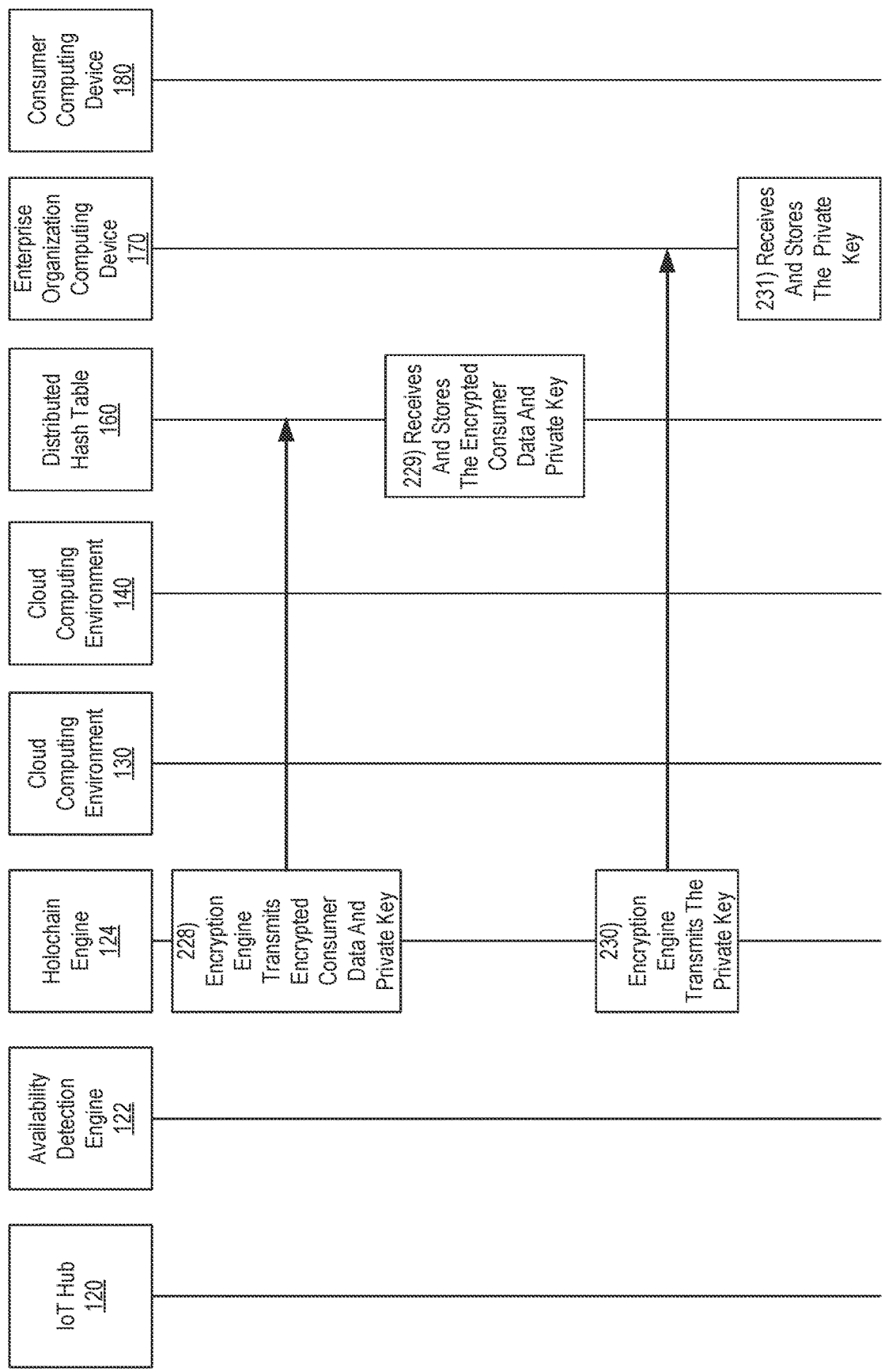

AUTOMATICALLY RE-ROUTING MULTI-CLOUD HOLOCHAIN DATA INGESTION BASED ON NETWORK ARCHITECTURE AVAILABILITY TO INTERNET OF THINGS (IoT) DEVICES

BACKGROUND

Aspects of the disclosure relate to hardware and/or software for automatically re-routing multi-cloud holochain data ingestion based on network architecture availability to internet of things (IoT) devices. In particular, one or more aspects of the disclosure relate to determining the storage capacity and storage cost associated with each cloud computing environment within a multi-cloud computing environment and re-routing consumer data to a cloud computing environment that satisfies selection criteria to provide robust, cost-efficient, and decentralized data storage.

Current data storage techniques within multi-cloud computing environments consist of data storage within data silos. A data silo may offer a centralized data storage method wherein data is deposited into a single location. While a data silo may provide a convenient and straightforward data storage method, using a data silo may not only hinder data accessibility as more data is added to the data silo, but may compromise the security of the data. For example, locating a specific data segment within the data silo may become increasingly difficult as data is continuously transmitted to the data silo. As more devices are configured to communicate across networks, the number of devices that may generate, transmit, and receive data increases. For example, as more devices connect to the internet of things (IoT), the number of devices that are capable of communication grows exponentially. Communication between such IoT devices may further increase as sophisticated network architecture emerges (e.g., upon the widespread use of 5G, 6G, 7G, 8G, 9G, or 10G network architecture). As data is generated between IoT devices, the data may be continuously transmitted to the data silo for storage. However, continuously transmitting data without first inspecting the data may permit corrupted data, or malicious data, to enter the data silo, thereby placing the existing data at risk.

An enterprise organization may use a data silo to store consumer data that is generated by a consumer. Consequently, the consumer data that is stored within the data silo may not only be difficult to access, but may be subject to unauthorized access. The use of a data silo may also increase an enterprise organization's financial burden as the data silo structure precludes the enterprise organization from selecting a data storage location that not only satisfies the enterprise organization's storage requirements, but is cost-efficient. As such, current data storage methods fail to present scalable, secure, and cost-efficient options for data storage.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with automatically re-routing multi-cloud holochain data ingestion based on network architecture availability to internet of things (IoT) devices.

In accordance with one or more embodiments, a method may comprise, at a computing device configured to operate within a multi-cloud computing environment and including at least one or more processors and memory, receiving, by an IoT hub and from an enterprise organization, a request to store consumer data. The method may comprise instructing, by the IoT hub, an availability detection engine to identify a cloud computing environment, of a plurality of cloud computing environments within the multi-cloud computing environment to store the consumer data. The method may comprise transmitting, by a plurality of automatic re-routing engines and to a holochain engine, information that describes the plurality of cloud computing environments, wherein each automatic re-routing engine of the plurality of automatic re-routing engines corresponds to a different cloud computing environment of the plurality of cloud computing environments. The method may comprise identifying, by the holochain engine and based on the information, the cloud computing environment of the plurality of cloud computing environments to store the consumer data. The method may comprise determining, by a validation engine, whether the consumer data satisfies validation criteria. The method may comprise, based on the determining, transmitting the consumer data to a logging engine based on the consumer data failing to satisfy the validation criteria or transmitting the consumer data to an encryption engine and a distributed hash table based on the consumer data successfully satisfying the validation criteria.

In accordance with one or more embodiments, a computing platform may comprise a computing device configured to operate within a multi-cloud computing environment, at least one processor, a communication interface communicatively coupled to the at least one processor, and memory storing computer-readable instructions that, when executed, cause the computing platform to receive, by an IoT hub and from an enterprise organization, a request to store consumer data. The computing platform may instruct, by the IoT hub, an availability detection engine to identify a cloud computing environment, of a plurality of cloud computing environments within the multi-cloud computing environment to store the consumer data. The computing platform may transmit, by a plurality of automatic re-routing engines and to a holochain engine, information that describes the plurality of cloud computing environments, wherein each automatic re-routing engine of the plurality of automatic re-routing engines corresponds to a different cloud computing environment of the plurality of cloud computing environments. The computing platform may identify, by the holochain engine and based on the information, the cloud computing environment of the plurality of cloud computing environments to store the consumer data. The computing platform may determine, by a validation engine, whether the consumer data satisfies validation criteria. The computing platform may, based on the determining, transmit the consumer data to a logging engine based on the consumer data failing to satisfy the validation criteria or transmit the consumer data to an encryption engine and a distributed hash table based on the consumer data successfully satisfying the validation criteria.

In accordance with one or more embodiments, one or more non-transitory computer-readable media storing instructions that, when executed by a computing platform comprising a computing device configured to operate within a multi-cloud computing environment, at least one processor, memory, and a communication interface, cause the computing platform to receive, by an IoT hub and from an enterprise organization, a request to store consumer data. The instructions, when executed, may cause the computing platform to instruct, by the IoT hub, an availability detection engine to identify a cloud computing environment, of a plurality of cloud computing environments within the multi-cloud computing environment to store the consumer data. The instructions, when executed, may cause the computing platform to transmit, by a plurality of automatic re-routing engines and to a holochain engine, information that describes the plurality of cloud computing environments, wherein each automatic re-routing engine of the plurality of automatic re-routing engines corresponds to a different cloud computing environment of the plurality of cloud computing environments. The instructions, when executed, may cause the computing platform to identify, by the holochain engine and based on the information, the cloud computing environment of the plurality of cloud computing environments to store the consumer data. The instructions, when executed, may cause the computing platform to determine, by a validation engine, whether the consumer data satisfies validation criteria. The instructions, when executed, may cause the computing platform to, based on the determining, transmit the consumer data to a logging engine based on the consumer data failing to satisfy the validation criteria or transmit the consumer data to an encryption engine and a distributed hash table based on the consumer data successfully satisfying the validation criteria.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 2A-2L depict an illustrative event sequence for automatically re-routing multi-cloud holochain data ingestion based on network architecture availability to internet of things (IoT) devices in accordance with one or more example embodiments.

DETAILED DESCRIPTION

Figure 1A:
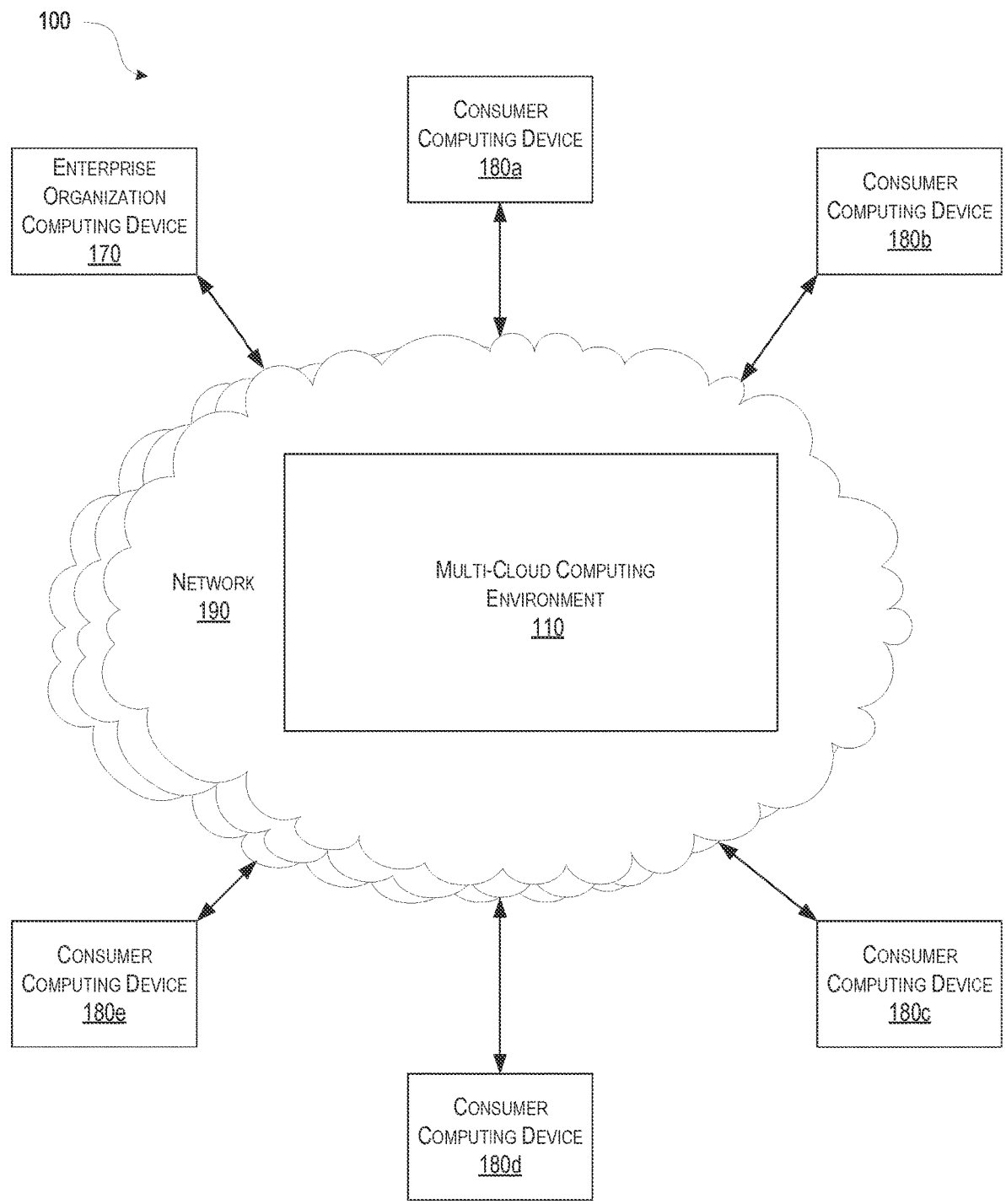
FIG. 1A depicts an illustrative example of a computing environment for automatically re-routing multi-cloud holochain data ingestion based on network architecture availability to internet of things (IoT) devices in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, data storage techniques may fail to present scalable, secure, and cost-efficient options for storing consumer data. The consumer data may be generated by personnel within an enterprise organization (e.g., administrative personnel, human resources personnel, or the like) or may be generated by personnel outside of the enterprise organization (e.g., a consumer request to withdraw funds from an account at a financial institution, consumer input of an authorization code to access assets within a financial institution, or the like). To generate the consumer data, a consumer may use a device that is connected to the internet of things (e.g., an IoT device). An IoT device may use existing network architecture to generate, transmit, and receive communications from other IoT devices (e.g., cell phones, tablets, portable communication devices, laptops, or the like). The IoT devices may be configured to operate on existing network architecture and may be decommissioned upon the emergence of new network architecture (e.g., an IoT device configured to operate on a 5G network may be decommissioned and retired as new IoT devices are configured to operate on 6G, 7G, 8G, 9G, 10G networks). As network architecture changes over time, new network architecture may be configured to process greater amounts of consumer data. Consequently, IoT devices may generate greater amounts of consumer data, and enterprise organizations may seek cost-efficient and secure methods for storing the consumer data.

Accordingly, proposed herein is a solution to the problem described above that includes automatically re-routing multi-cloud holochain data ingestion based on network architecture availability to IoT devices. For example, the enterprise organization may receive consumer data from a consumer. The enterprise organization may transmit, to a multi-cloud computing environment, the consumer data and a request to store the consumer data within one of the cloud computing environments that comprises the multi-cloud computing environment. Each cloud computing environment of the multi-cloud computing environment may provide a data storage data structure (e.g., a distributed hash table), wherein the consumer data may be stored and accessed at a later time.

Upon receipt of the consumer data and the request from the enterprise organization, the multi-cloud computing environment may transmit the consumer data and the request to an IoT hub for processing. The IoT hub may be the central processing center of the multi-cloud computing environment. The IoT hub may store the consumer data and may instruct an availability detection engine to gather information that describes each cloud computing environment of the multi-cloud computing environment (e.g., the current capacity of the cloud computing environment, the cost associated with storing consumer data within the cloud computing environment, or the like). The availability detection engine may instruct a plurality of automatic re-routing engines to poll a plurality of cloud computing environments, wherein each automatic re-routing engine communicates with one cloud computing environment and gathers information that describes that one cloud computing environment. Each automatic re-routing engine may transmit its collected information to a holochain engine.

The holochain engine may compare the received information to selection criteria provided by the enterprise organization. The holochain engine may identify a cloud computing environment that satisfies the selection criteria. The holochain engine may determine that the consumer data may be stored within the cloud computing environment that satisfies the selection criteria. The holochain engine may inform each automatic re-routing engine of the cloud computing environment that may store the consumer data so that each automatic re-routing engine may be aware of the location of the consumer data. The holochain engine may retrieve the consumer data that was stored by the IoT hub and may transmit the consumer data to a validation engine.

The validation engine may analyze the consumer data to ensure the consumer data satisfies validation criteria established by the enterprise organization. The validation engine may determine that the consumer data fails to satisfy the validation criteria. As such, the validation engine may transmit the consumer data to a logging engine. The logging engine may analyze the consumer data and the failed validation criteria to determine why the consumer data failed to satisfy the validation criteria. The logging engine may determine whether to prohibit the consumer associated with the consumer data from transmitting consumer data to the enterprise organization in the future.

Alternatively, the validation engine may determine that the consumer data satisfies the validation criteria. As such, the validation engine may transmit the consumer data to an encryption engine. The encryption engine may generate public and private key pairs that may be used to encrypt and access the consumer data. The encryption engine may use the public key of the key pair to encrypt the consumer data. The encryption engine may transmit the private key and the encrypted consumer data to a distributed hash table. The distributed hash table may store the consumer data and the corresponding private key. The holochain engine may transmit, to the distributed hash table, a notification indicating the cloud computing environment, of the multi-cloud computing environment, that satisfied the selection criteria and may store the encrypted consumer data. The distributed hash table may store the indication of the cloud computing environment, of the multi-cloud computing environment, that may store the encrypted consumer data. The distributed hash table may store the encrypted consumer data within the indicated cloud computing environment (e.g., write the consumer data to the cloud computing environment).

The disclosure provided herein is described, at least in part, in relation to a multi-cloud environment which supports the IoT hub and stores the consumer data. In at least some examples, the multi-cloud environment may be comprised of at least two cloud computing environments that are of the same type (e.g., each cloud computing environment within the multi-cloud environment is a public cloud, each cloud computing environment within the multi-cloud environment is a private cloud, or the like). In some examples, the multi-cloud environment may be comprised of at least two cloud computing environments that are of different types (e.g., a combination of public cloud computing environments and private cloud computing environments). The multi-cloud environment may facilitate communication and data transmission between the enterprise organization and the consumer computing devices (e.g., IoT devices).

Computer Architecture

FIG. 1A depicts an illustrative example of computing environment 100 that may be used for automatically re-routing multi-cloud holochain data ingestion based on network architecture availability for IoT devices. Computing environment 100 may comprise one or more computing devices, including at least multi-cloud computing environment 110, enterprise organization computing device 170, and consumer computing devices 180a-180e. While FIG. 1A depicts more than one consumer computing device (e.g. consumer computing devices 180a-180e), each of consumer computing devices 180a-180e may be configured in accordance with the features described herein. While the description herein may make reference to consumer computing device 180, it is important to note that the functions described in connection with consumer computing device 180 may also be performed by any one of consumer computing devices 180a-180e. Each one of consumer computing devices 180a-180e and enterprise organization computing device 170 may be configured to communicate with multi-cloud computing environment 110 across network 190. In some arrangements, computing environment 100 may include additional computing devices and cloud environments that are not depicted in FIG. 1A, which may also be configured to interact with multi-cloud computing environment 110 and, in some instances, consumer computing device 180.

Multi-cloud computing environment 110 may be associated with a centralized entity such as an enterprise organization, company, school, government, or the like, and may comprise one or more IoT devices (e.g., enterprise organization computing device 170, consumer computing device 180), such as personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), or the like.

Multi-cloud computing environment 110 may include computing hardware and/or software that may host various data and applications for performing tasks of the centralized entity and interacting with consumer computing device 180, as well as other computing devices. As discussed in detail in connection with FIG. 1B, multi-cloud computing environment 110 may comprise IoT hub 120, cloud computing environment 130, cloud computing environment 140, and distributed hash table 160.

Each computing device within multi-cloud computing environment 110 may contain processor(s) 111 and database 112, which may be stored in memory of the one or more computing devices of multi-cloud computing environment 110. Through execution of computer-readable instructions stored in memory, the computing devices of multi-cloud computing environment 110 may be configured to perform functions of the centralized entity and store the data generated during the performance of such functions in database 112.

In some arrangements, multi-cloud computing environment 110 may include and/or be part of enterprise information technology infrastructure and may host a plurality of enterprise applications, enterprise databases, and/or other enterprise resources. Such applications may be executed on one or more computing devices included in multi-cloud computing environment 110 using distributed computing technology or the like. In some instances, multi-cloud computing environment 110 may include a relatively large number of servers that may support operations of the enterprise organization, such as a financial institution.

With further reference to FIG. 1A, enterprise organization computing device 170 may be configured to interact with multi-cloud computing environment 110 across network 190. Enterprise organization computing device 170 may be associated with an enterprise organization that may receive consumer data from consumer computing device 180. The enterprise organization may utilize cloud storage (e.g., multi-cloud computing environment 110) to store the consumer data. To do so, enterprise organization computing device 170 may transmit, to IoT hub 120, the received consumer data and a request to store the consumer data within a cloud computing environment of multi-cloud computing environment 110. Upon receipt of the consumer data and the request, IoT hub 120 may process the request and may engage a plurality of engines to identify a cloud computing environment that may store the consumer data, as discussed in connection with FIG. 1B.

Enterprise organization computing device 170 may continuously transmit consumer data, and requests to store the consumer data, to IoT hub 120 such that the entirety of the consumer data received by enterprise organization computing device 170 may be stored within a cloud computing environment of multi-cloud computing environment 110, as opposed to local storage on physical computing devices within the enterprise organization.

Enterprise organization computing device 170 may generate and transmit selection criteria to holochain engine 124. The selection criteria may indicate the enterprise organization's preferences for identifying a cloud computing environment within which to store the consumer data (e.g., an amount of storage space within a cloud computing environment that the enterprise organization may be interested in purchasing, the enterprise organization's budget for purchasing storage space within a cloud computing environment, or the like). The enterprise organization may be interested in purchasing storage within a cloud computing environment that not only provides cost-efficient storage opportunities, but has capacity to store the consumer data transmitted to enterprise organization computing device 170. Over time, the enterprise organization may develop new or additional selection criteria. In such instances, enterprise organization computing device 170 may transmit the new or additional selection criteria to holochain engine 124.

Enterprise organization computing device 170 may generate and transmit validation criteria to validation engine 126 of holochain engine 124. The validation criteria may indicate criteria for determining whether the consumer data may proceed to encryption engine 128 and whether the consumer data may be stored in a cloud computing environment of multi-cloud computing environment 110 (e.g., whether the consumer data is corrupted, whether the consumer data contains blank data entries, whether components of the consumer data contain malicious data, or the like). The enterprise organization may be interested in encrypting and storing only the consumer data that satisfies the validation criteria (e.g., the consumer data that is not corrupted, the consumer data that contains populated data entries, the consumer data that does not contain malicious data, or the like). Over time, the enterprise organization may develop new or additional validation criteria. In such instances, enterprise organization computing device 170 may transmit the new or additional validation criteria to validation engine 126.

Enterprise organization computing device 170 may receive, from holochain engine 124, a notification indicating that each one of the cloud computing environments within multi-cloud computing environment 110 (e.g., cloud computing environments 130 and 140) fails to satisfy the selection criteria. The notification may request new or modified selection criteria such that holochain engine 124 may identify a cloud computing environment that may store the consumer data. Enterprise organization computing device 170 may generate and transmit, to holochain engine 124, new or modified selection criteria. Enterprise organization computing device 170 may continue to generate and transmit new or modified selection criteria until holochain engine 124 is able to identify a cloud computing environment within which the consumer data may be stored.

Enterprise organization computing device 170 may receive, from validation engine 126 of holochain engine 124, a notification indicating either one of a successful validation of the consumer data or a failed validation of the consumer data. The notification indicating the successful validation of the consumer data may indicate that the consumer data successfully satisfied the validation criteria and may proceed to encryption engine 128 for encryption before being stored in a cloud computing environment of multi-cloud computing environment 110. Alternatively, the notification indicating a failed validation of the consumer data may indicate that the consumer data failed to satisfy the validation criteria and that the consumer data may be transmitted to logging engine 127, wherein logging engine 127 may analyze the consumer data to determine why the consumer data failed to satisfy the validation criteria.

Enterprise organization computing device 170 may receive, from encryption engine 128 of holochain engine 124, private keys that may be used to access the encrypted consumer data. Enterprise organization computing device 170 may receive a private key, which corresponds to the public key that is used to encrypt the consumer data, each time consumer data is encrypted by encryption engine 128. Enterprise organization computing device 170 may use the private keys to request access to the encrypted enterprise data. To request access to the encrypted consumer data, enterprise organization computing device 170 may transmit, to distributed hash table 160, a request to access the encrypted consumer data, wherein the request may indicate the private key that corresponds to the public key that was used to encrypt the consumer data. Distributed hash table 160 may compare the private key received from enterprise organization computing device 170 to the private key stored in the hash table. Distributed hash table 160 may permit enterprise organization computing device 170 to access the encrypted consumer data if the private keys match.

Enterprise organization computing device 170 may also retrieve the private key from key pair database 129. Key pair database 129 may contain the public and private key pairs generated by encryption engine 128. Encryption engine 128 may be associated with first level of access (e.g., a least restrictive level of access). As such, encryption engine 128 may perform actions upon the key pairs within key pair database 129 (e.g., add new key pairs, remove key pairs, update key pairs, re-organize key pairs, or the like). Enterprise organization computing device 170 may be associated with a second level of access (e.g., a more restrictive level of access than the first level of access). As such, enterprise organization computing device 170 may perform limited actions upon the key pairs within key pair database 129 (e.g., may only be permitted to view the key pairs).

Consumer computing device 180 may be configured to interact with multi-cloud computing environment 110 across network 190. In some instances, consumer computing device 180 may be configured to receive and transmit information corresponding to system requests through particular channels and/or representations of webpages and/or applications associated with multi-cloud computing environment 110.

Consumer computing device 180 may be a device that is connected to the internet of things (e.g., an IoT device). An IoT device may use existing network architecture to generate, transmit, and receive communications from other IoT devices (e.g., cell phones, tablets, laptops, portable communication devices, or the like). The IoT devices may be configured to operate on existing network architecture and may be decommissioned upon the emergence of new network architecture (e.g., an IoT device configured to operate on a 5G network may be decommissioned and retired as new IoT devices are configured to operate on 6G, 7G, 8G, 9G, 10G networks).

Consumer computing device 180 may be associated with entities within the enterprise organization or may be associated with entities outside of the enterprise organization. If consumer computing device 180 is associated with an entity within the enterprise organization, the entity associated with consumer computing device 180 may be different from the entity associated with enterprise organization computing device 170. For example, the entity within the enterprise organization that is associated with consumer computing device 180 may be associated with a level of authorization that is more restrictive than the level of authorization associated with enterprise organization computing device 170. Alternatively, consumer computing device 180 may be associated with an entity outside of the enterprise organization. If consumer computing device 180 is associated with an entity outside of the enterprise organization, consumer computing device 180 may be associated with a level of authorization that is more restrictive than the level of authorization associated with either one of enterprise organization computing device 170 or consumer computing device 180 when consumer computing device 180 is associated with an entity within the enterprise organization.

Consumer computing device 180 may generate data (e.g., consumer data). By connecting to the IoT, consumer computing device 180 may communicate with other IoT devices. Consumer computing device 180 may generate consumer data by transmitting and receiving communication from other computing IoT devices. Consumer computing device 180 may transmit the generated consumer data to enterprise organization computing device 170, such that the enterprise organization associated with enterprise organization computing device 170 may store the consumer data. Consumer computing device 180 may communicate with enterprise organization computing device 170 across network 190.

Computing environment 100 also may include one or more networks, which may interconnect one or more of multi-cloud computing environment 110, enterprise organization computing device 170, and consumer computing device 180. For example, computing environment 100 may include network 190. Network 190 may include one or more sub-networks (e.g., local area networks (LANs), wide area networks (WANs), or the like). The architecture of network 190 may change over time as network support technology advances. As such, network 190 may be scaled to match the existing state of network support technology. For example, if the existing network support technology is capable of supporting a 5G, 6G, 7G, 8G, 9G, or 10G network, then network 190 may be one of a 5G, 6G, 7G, 8G, 9G, or 10G network.

Figure 1B:
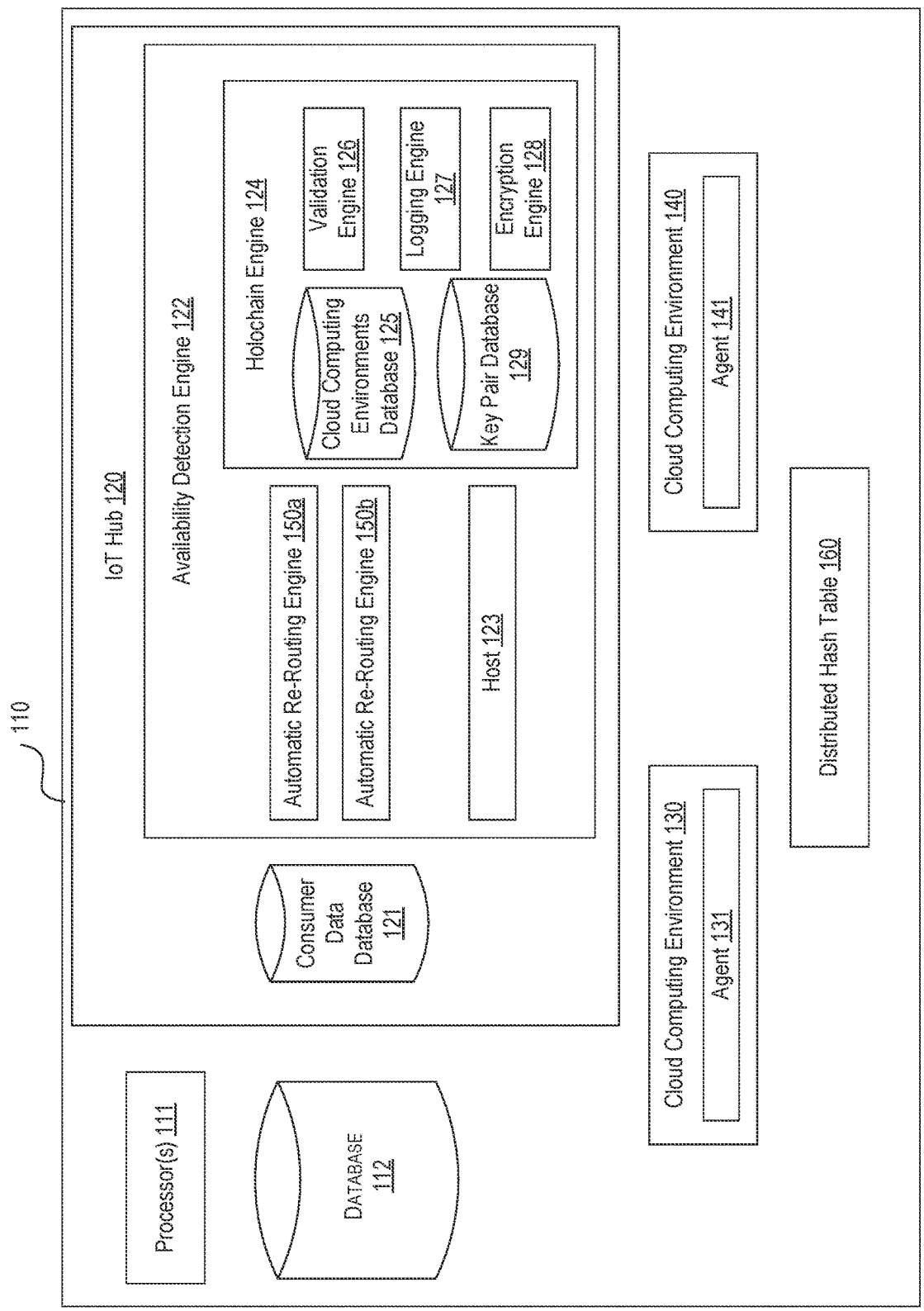
FIG. 1B depicts an illustrative example of the multi-cloud computing environment that may be used for automatically re-routing multi-cloud holochain data ingestion based on network architecture availability to internet of things (IoT) devices in accordance with one or more example embodiments.

FIG. 1B depicts the components of multi-cloud computing environment 110 that may be used for automatically re-routing multi-cloud holochain data ingestion based on network architecture availability for internet of things (IoT) devices. As discussed above, multi-cloud computing environment 110 may contain IoT hub 120, cloud computing environment 130, cloud computing environment 140, and distributed hash table 160.

IoT hub 120 may contain consumer data database 121, availability detection engine 122, automatic re-routing engines 150*a* and 150*b*, host 123, and holochain engine 124. IoT hub 120 may receive, from enterprise organization computing device 170, the consumer data generated by consumer computing device 180. IoT hub 120 may further receive, from enterprise organization computing device 170, a request to store the consumer data within a cloud computing environment of multi-cloud computing environment 110. Iot hub 120 may store the consumer data in consumer data database 121.

Consumer data database 121 may contain the entirety of the consumer data received by IoT hub 120 and from enterprise organization computing device 170. IoT hub 120 may be associated with a first level of access (e.g., the least restrictive level of access). As such, IoT hub 120 may be permitted to perform a number of actions upon the data within consumer data database 121 (e.g., add new consumer data, remove consumer data, update consumer data, re-organize consumer data, or the like). Holochain engine 124 may be associated with a second level of access (e.g., a level of access that is more restrictive than the first level of access). As such, holochain engine 124 may be permitted to perform limited actions upon the data within consumer data database 121 (e.g., may only be permitted to view and retrieve the data). IoT hub 120 may review the request received from enterprise organization computing device 170. IoT hub 120 may transmit, to availability detection engine 122, a request to gather information that describes each cloud computing environment of multi-cloud computing environment 110 such that holochain engine 124 may identify a cloud computing environment that may store the consumer data.

Availability detection engine 122 may contain automatic re-routing engines 150*a* and 150*b*, host 123, and holochain engine 124. Availability detection engine 122 may communicate with IoT hub 120 using host 123. Host 123 may contain a plurality of servers which support communication within and across each computing device of multi-cloud computing environment 110.

Availability detection engine 122 may receive, from IoT hub 120, the request to gather information that describes each cloud computing environment of multi-cloud computing environment 110. Availability detection engine 122 may instruct a plurality of automatic re-routing engines (e.g., automatic re-routing engines 150*a* and 150*b*) to poll each cloud computing environment of multi-cloud computing environment 110. Each one of automatic re-routing engines 150*a* and 150*b* may correspond to a different cloud computing environment of multi-cloud computing environment 110. For example, automatic re-routing engine 150*a* may correspond to cloud computing environment 130 and automatic re-routing engine 150*b* may correspond to cloud computing environment 140. While only two automatic re-routing engines and two cloud computing environments are depicted in FIG. 1B, more than two automatic re-routing engines and cloud computing environments may exist. The number of automatic re-routing engines that exist within availability detection engine 122 may directly correspond to the number of cloud computing environments within multi-cloud computing environment 110. For example, if multi-cloud computing environment 110 contains thirty cloud computing environments, then availability detection engine 122 may generate thirty automatic re-routing engines such that each automatic re-routing engine corresponds to a cloud computing environment.

Each one of automatic re-routing engines 150a and 150b may receive the instruction to poll the corresponding cloud computing environment to gather information that describes the cloud computing environment. The instruction to poll each cloud computing environment may contain criteria that each one of automatic re-routing engines 150a and 150b may gather from each of cloud computing environments 130 and 140 (e.g., the amount of storage that is available within each cloud computing environment, the cost associated with purchasing storage from each cloud computing environment, the current storage capacity of each cloud computing environment, the maximum storage capacity of each cloud computing environment, or the like).

Each one of automatic re-routing engines 150a and 150b may communicate with agents 131 and 141 of cloud computing environments 130 and 140. Each one of cloud computing environments 130 and 140 may contain an agent (e.g., agents 131 and 141). For example, agent 131 may correspond to cloud computing environment 130 and agent 141 may correspond to cloud computing environment 140. Each one of agents 131 and 141 may track and maintain information that describes each one of cloud computing environments 130 and 140 (e.g., the amount of storage that is available within each cloud computing environment, the cost associated with purchasing storage from each cloud computing environment, the current storage capacity of each cloud computing environment, the maximum storage capacity of each cloud computing environment, or the like). Automatic re-routing engines 150a and 150b may request, from agents 131 and 141, information that describes cloud computing environments 130 and 140. Automatic re-routing engines 150a and 150b may receive, from agents 131 and 141, information that describes cloud computing environments 130 and 140, and may transmit, to holochain engine 124, the information that describes cloud computing environments 130 and 140.

Holochain engine 124 may contain cloud computing environments databases 125, validation engine 126, logging engine 127, encryption engine 128, and key pair database 129. Holochain engine 124 may receive, from each one of automatic re-routing engines 150a and 150b, information that describes each cloud computing environment of multi-cloud computing environment 110. Holochain engine 124 may store the received information in cloud computing environments database 125. Cloud computing environments database 125 may contain a list of the cloud computing environments within multi-cloud computing environment 110, information that describes each cloud computing environment, and an indication of the cloud computing environment that may store the consumer data. Holochain engine 124 may be associated with a first level of access (e.g., the least restrictive level of access). As such, holochain engine 124 may be permitted to perform a number of actions upon the data within cloud computing environments database 125 (e.g., add new cloud computing environments to the list of existing cloud computing environments, remove cloud computing environments from the list, update the information that describes each cloud computing environment, update the indication of the cloud computing environment that may store the consumer data, or the like). Each one of automatic re-routing engines 150a and 150b, and distributed hash table 160 may be associated with a second level of access (e.g., a level of access that is more restrictive than the first level of access). As such, automatic re-routing engines 150a and 150b may be permitted to perform limited actions upon the data within cloud computing environments database 125 (e.g., may only be permitted to view the data).

Holochain engine 124 may analyze the information received from automatic re-routing engines 150a and 150b using selection criteria. Holochain engine 124 may receive the selection criteria from enterprise organization computing device 170. The selection criteria may indicate the enterprise organization's preferences for identifying a cloud computing environment within which to store the consumer data (e.g., the amount of storage space within a cloud computing environment that the enterprise organization may be interested in purchasing, the enterprise organization's budget for purchasing storage space within a cloud computing environment, or the like). The enterprise organization may be interested in purchasing storage within a cloud computing environment that not only provides cost-efficient storage opportunities, but has capacity to store the consumer data transmitted to enterprise organization computing device 170. Holochain engine 124 may compare the information received from automatic re-routing engines 150a and 150b to the selection criteria to determine whether a cloud computing environment within multi-cloud computing environment 110 satisfies the selection criteria.

Holochain engine 124 may determine that a cloud computing environment (e.g., one of cloud computing environments 130 or 140) satisfies the selection criteria. In such instances, holochain engine 124 may determine that the cloud computing environment that satisfies the selection criteria may store the consumer data. Alternatively, holochain engine 124 may determine more than one cloud computing environment (e.g., both of cloud computing environments 130 and 140) satisfies the selection criteria. In such instances, holochain engine 124 may select, from the cloud computing environments that satisfy the selection criteria, a cloud computing environment within which the consumer data may be stored. Alternatively, holochain engine 124 may determine that neither one of cloud computing environment 130 nor cloud computing environment 140 satisfies the selection criteria. In such instances, holochain engine 124 may transmit, to enterprise organization computing device 170, a notification indicating that neither one of cloud computing environment 130 nor cloud computing environment 140 satisfies the selection criteria.

The notification may request new or modified selection criteria from enterprise organization computing device 170, such that holochain engine 124 may identify the cloud computing environment that may store the consumer data. Holochain engine 124 may receive, from enterprise organization computing device 170, new or modified selection criteria. Holochain engine 124 may compare the information received from automatic re-routing engines 150a and 150b to the new or modified selection criteria to identify a cloud computing environment within which the consumer data may be stored. Holochain engine 124 may continuously request new or modified selection criteria from enterprise organization computing device 170 until holochain engine 124 is able to identify a cloud computing environment that may store the consumer data.

Holochain engine 124 may identify a cloud computing environment within multi-cloud computing environment 110 (e.g., one of cloud computing environments 130 or 140) that satisfies the selection criteria generated by enterprise organization computing device 170. Holochain engine 124 may transmit, to each of automatic re-routing engines 150*a* and 150*b*, a notification indicating the cloud computing environment that may store the consumer data such that each of automatic re-routing engines 150*a* and 150*b* may be aware of the location of the consumer data. Holochain engine 124 may transmit, to distributed hash table 160, a notification indicating the cloud computing environment that may store the consumer data. Holochain engine 124 may retrieve, from consumer data database 121, the consumer data and may transmit the consumer data to validation engine 126.

Validation engine 126 may receive the consumer data from holochain 124. Validation engine 126 may receive, from enterprise organization computing device 170, validation criteria. The validation criteria may indicate criteria for determining whether the consumer data may proceed to encryption engine 128 and whether the consumer data may be stored in a cloud computing environment of multi-cloud computing environment 110 (e.g., whether the consumer data is corrupted, whether the consumer data contains blank data entries, whether components of the consumer data contain malicious data, or the like). The enterprise organization may be interested in encrypting and storing only the consumer data that satisfies the validation criteria (e.g., the consumer data that is not corrupted, the consumer data that contains populated data entries, the consumer data that does not contain malicious data, or the like).

Validation engine 126 may compare the consumer data to the validation criteria. Validation engine 126 may determine that the consumer data fails to satisfy the validation criteria. In such instances, validation engine 126 may transmit the consumer data and the failed validation criteria to logging engine 127. Validation engine 126 may further transmit a notification to enterprise organization computing device 170 indicating that the consumer data failed to satisfy the validation criteria. The notification may further indicate that the consumer data may be transmitted to logging engine 127, wherein logging engine 127 may analyze the consumer data to determine why the consumer data failed to satisfy the validation criteria.

Alternatively, validation engine 126 may determine that the consumer data satisfies the validation criteria. In such instances, validation engine 126 may transmit the consumer data to encryption engine 128. Validation engine may further transmit a notification to enterprise organization computing device 170 indicating that the consumer data successfully satisfied the validation criteria and that the consumer data may proceed to encryption engine 128 for encryption before being stored in the cloud computing environment identified by holochain engine 124.

Logging engine 127 may receive, from validation engine 126, the consumer data and the failed validation criteria. Logging engine 127 may analyze the consumer data and the failed validation criteria to determine the reason(s) that the consumer data failed to satisfy the validation criteria. Logging engine 127 may extract, from the consumer data, the consumer device associated with the consumer data (e.g., consumer computing device 180) and may determine whether to prohibit the consumer device from transmitting consumer data to enterprise organization computing device 170 at a later time. Logging engine 127 may determine whether to prohibit the consumer device from transmitting consumer data depending on the reason(s) that the consumer data failed to satisfy the validation criteria (e.g., whether the consumer device transmitted malicious data, whether the consumer device transmitted blank data entries, whether the consumer device transmitted corrupted data, or the like).

Encryption engine 128 may receive the consumer data from validation engine 126. Encryption engine 128 may generate public and private key pairs, wherein the public keys may be used to encrypt the consumer data and the private keys may be used to access the encrypted consumer data. Encryption engine 128 may store public and private key pairs in key pair database 129. Key pair database 129 may contain the public and private key pairs generated by encryption engine 128. Encryption engine 128 may be associated with first level of access (e.g., the least restrictive level of access). As such, encryption engine 128 may perform actions upon the key pairs within key pair database 129 (e.g., add new key pairs, remove key pairs, update key pairs, re-organize key pairs, or the like). Enterprise organization computing device 170 may be associated with a second level of access (e.g., a more restrictive level of access than the first level of access). As such, enterprise organization computing device 170 may perform limited actions upon the key pairs within key pair database 129 (e.g., may only be permitted to view the key pairs).

Encryption engine 128 may use the public key to encrypt the consumer data. Encryption engine 128 may transmit, to enterprise organization computing device 170, the private key that corresponds to the public key that encryption engine 128 may use to encrypt the consumer data. Encryption engine 128 may transmit, to distributed hash table 160, the encrypted consumer data and the private key that corresponds to the public key that encryption engine 128 may use to encrypt the consumer data.

Returning to the description of multi-cloud computing environment 110, multi-cloud computing environment 110 may contain at least two cloud computing environments (e.g., cloud computing environments 130 and 140). As mentioned above, while two cloud computing environments are depicted in FIG. 1B, more than two cloud computing environments may exist within multi-cloud computing environment 110. Each one of cloud computing environments 130 and 140 may contain an agent (e.g., agents 131 and 141). For example, agent 131 may correspond to cloud computing environment 130 and agent 141 may correspond to cloud computing environment 140. Each one of agents 131 and 141 may track and maintain information that describes each one of cloud computing environments 130 and 140 (e.g., the amount of storage that is available within each cloud computing environment, the cost associated with purchasing storage from each cloud computing environment, the current storage capacity of each cloud computing environment, the maximum storage capacity of each cloud computing environment, or the like). Agents 131 and 141 may continuously monitor the corresponding cloud computing environment and may continuously update the information that describes each cloud computing environment.

Agents 131 and 141 may receive, from automatic re-routing engines 150*a* and 150*b*, requests for information that describes cloud computing environments 130 and 140. Agents 131 and 141 may retrieve the most recent information that describes computing environments 130 and 140, and may transmit the most recent information to automatic re-routing engines 150*a* and 150*b*.

One of cloud computing environments 130 or 140 may receive, from distributed hash table 160, a notification indicating that the cloud computing environment may store the encrypted consumer data. The cloud computing environment that may store the encrypted consumer data (e.g., one of cloud computing environments 130 or 140) may receive, from distributed hash table 160, the encrypted consumer data. The cloud computing environment may store the encrypted consumer data.

Distributed hash table 160 may provide an organizational system for tracking the cloud computing environment that stores the encrypted consumer data and the private key that may be used to access the encrypted consumer data. Distributed hash table 160 may receive, from encryption engine 128, the encrypted consumer data and the private key that corresponds to the public key that encryption engine 128 may use to encrypt the consumer data. Distributed hash table 160 may store the encrypted consumer data and the private key within the table. Distributed hash table 160 may receive, from holochain engine 124, a notification indicating the cloud computing environment of multi-cloud computing environment 110 that may store the consumer data. Distributed hash table 160 may transmit the encrypted consumer data to the cloud computing environment identified by holochain engine 124.

Distributed hash table 160 may receive, from enterprise organization computing device 170, a request to access the encrypted consumer data, wherein the request may indicate the private key that corresponds to the public key that was used to encrypt the consumer data. Distributed hash table 160 may verify that the private key within the request from enterprise organization computing device 170 matches the private key that was used to encrypt the consumer data. If the private key within the request from enterprise organization computing device 170 matches the private key that was used to encrypt the consumer data, distributed hash table 160 may allow enterprise organization computing device 170 to access the encrypted consumer data. However, if the private key within the request from enterprise organization computing device 170 fails to match the private key that corresponds to the public key that was used to encrypt the consumer data, distributed hash table 160 may deny the request to access the encrypted consumer data.

Automatically Re-Routing Multi-Cloud Holochain Data Ingestion Based on Network Architecture Availability for Internet of Things (IoT) Devices FIGS. 2A-2L depict an illustrative event sequence for automatically re-routing multi-cloud holochain data ingestion based on network architecture availability for IoT devices. The events shown are merely one example sequence and one or more events may be performed in a different order, omitted, or steps may be added without departing from the invention. One or more aspects described herein may be performed in real-time or near real-time.

Figure 2A:
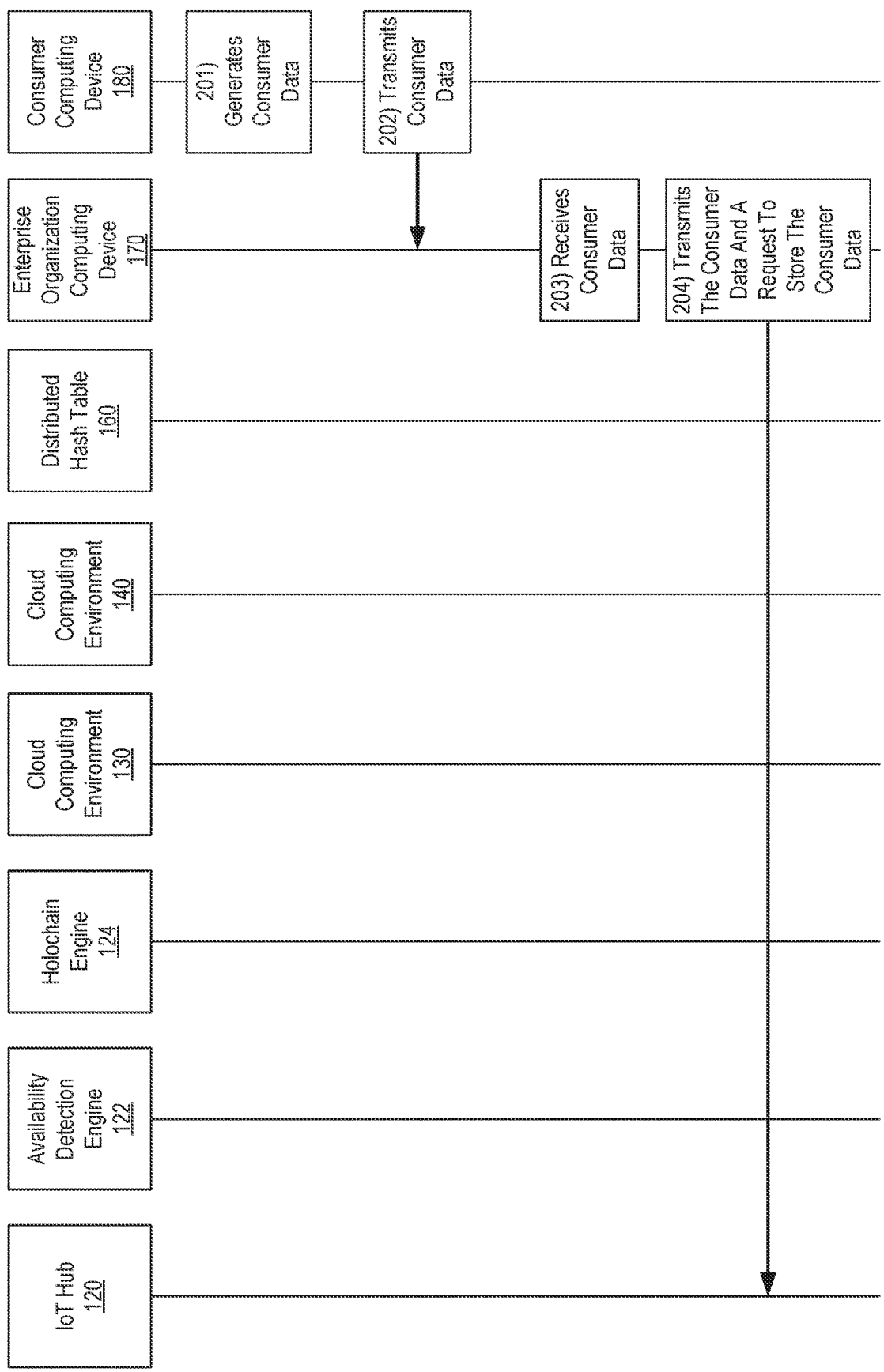

Referring to FIG. 2A, at step 201, consumer computing device 180 may generate consumer data. Consumer computing device 180 may be a device that is connected to the internet of things (e.g., an IoT device). An IoT device may use existing network architecture to generate, transmit, and receive communications from other IoT devices (e.g., cell phones, tablets, laptops, portable communication devices, or the like). The IoT devices may be configured to operate on existing network architecture and may be decommissioned upon the emergence of new network architecture (e.g., an IoT device configured to operate on a 5G network may be decommissioned and retired as new IoT devices are configured to operate on 6G, 7G, 8G, 9G, 10G networks). By connecting to the IoT, consumer computing device 180 may communicate with other computing devices that are connected to the IoT. Consumer computing device 180 may generate consumer data by transmitting communication to and receiving communication from other computing devices connected to the IoT.

For example, a first IoT device may be a smart phone and a second IoT device may be a laptop computer. A first consumer may use the smart phone to draft an e-mail and to transmit the e-mail to a second consumer. The second consumer may access the e-mail using the laptop computer and may draft a response to the e-mail using the laptop computer. The e-mails that are exchanged between the smart phone and the laptop computer may be one example of consumer data.

At step 202, consumer computing device 180 may transmit the consumer data to enterprise organization computing device 170 for data retention and data storage purposes. At step 203, enterprise organization computing device 170 may receive the consumer data transmitted from consumer computing device 180.

At step 204, enterprise organization computing device 170 may transmit, to IoT hub 120, the received consumer data and a request to store the consumer data within a cloud computing environment of multi-cloud computing environment 110 (e.g., one of cloud computing environments 130 or 140). Enterprise organization computing device 170 may transmit (e.g., continuously, in batches, or the like) consumer data, and requests to store the consumer data, to IoT hub 120 such that the entirety of the consumer data received by enterprise organization computing device 170 may be stored within a cloud computing environment of multi-cloud computing environment 110, as opposed to local storage on physical computing devices within the enterprise organization.

Figure 2B:
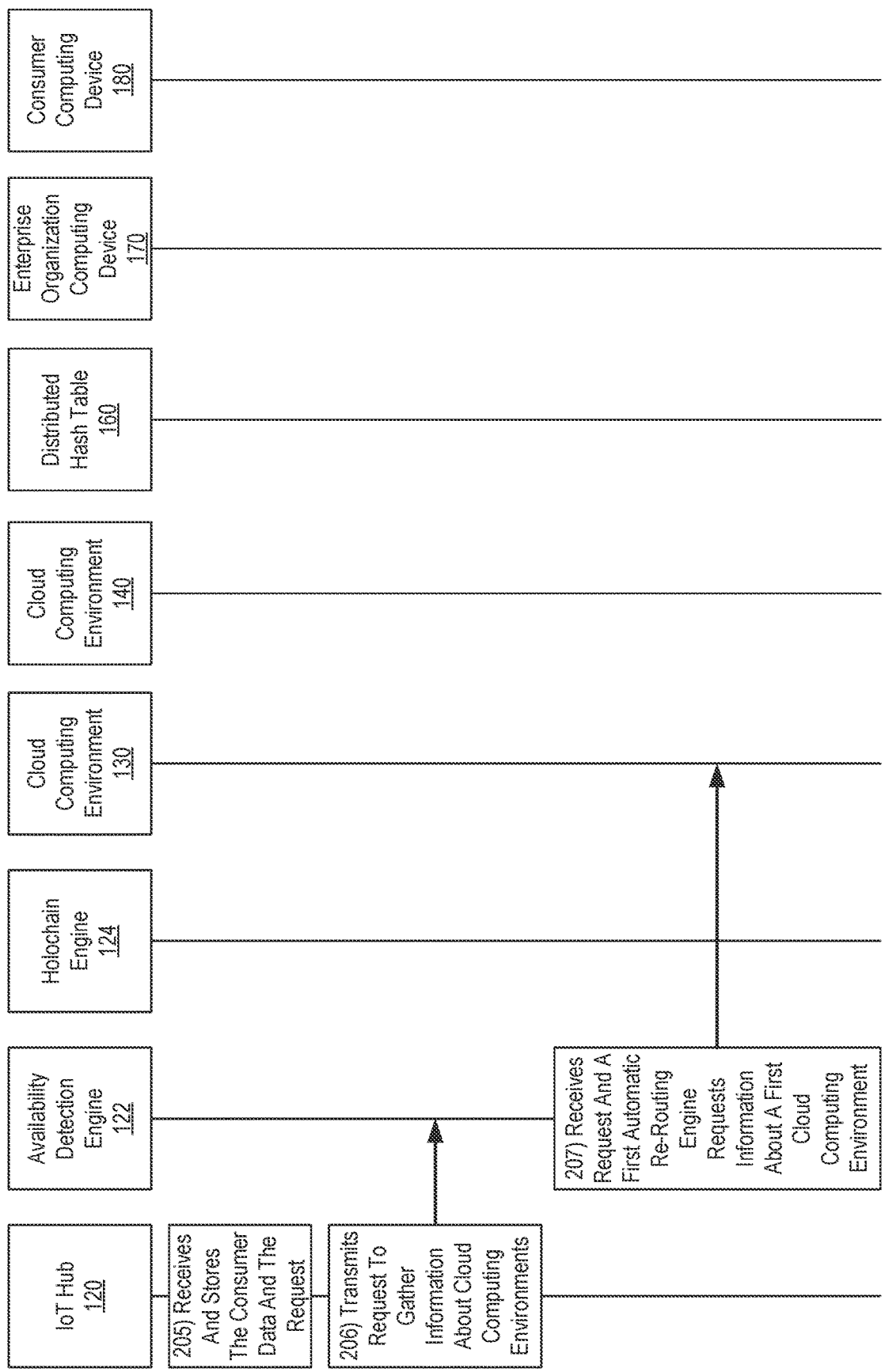

Referring to FIG. 2B, at step 205, IoT hub 120 may receive and store the consumer data from enterprise organization computing device 170. IoT hub 120 may further receive and store the request to store the consumer data within a cloud computing environment of multi-cloud computing environment 110. IoT hub 120 may store the consumer data in consumer data database 121. Consumer data database 121 may contain the entirety of the consumer data received by IoT hub 120 and from enterprise organization computing device 170. IoT hub 120 may be associated with a first level of access (e.g., the least restrictive level of access). As such, IoT hub 120 may be permitted to perform a number of actions upon the data within consumer data database 121 (e.g., add new consumer data, remove consumer data, update consumer data, re-organize consumer data, or the like). IoT hub 120 may review the request from enterprise organization computing device 170 and, at step 206, IoT hub 120 may transmit, to availability detection engine 122, a request to gather information that describes each cloud computing environment of multi-cloud computing environment 110 (e.g., cloud computing environments 130 and 140).

At step 207, availability detection engine 122 may receive the request from IoT hub 120 to gather information that describes each cloud computing environment of multi-cloud computing environment 110. Availability detection engine 122 may transmit, to a first automatic re-routing engine (e.g., any one of automatic re-routing engines 150a or 150b), a request to gather information about a first cloud computing environment (e.g., one of cloud computing environments 130 or 140). While the first cloud computing environment may refer to either one of cloud computing environments 130 or 140, this description will refer to cloud computing environment 130 as the first cloud computing environment for illustration purposes.

Each one of automatic re-routing engines 150*a* and 150*b* may correspond to a different cloud computing environment of multi-cloud computing environment 110. For example, automatic re-routing engine 150*a* may correspond to cloud computing environment 130 and automatic re-routing engine 150*b* may correspond to cloud computing environment 140. Therefore, at step 207, availability detection engine 122 may transmit a request to automatic re-routing engine 150*a* to gather information that describes cloud computing environment 130.

Referring to FIG. 2C, at step 208, an agent within cloud computing environment 130 (e.g., agent 131) may receive the request transmitted by automatic re-routing engine 150*a* in step 207. Agent 131 may track and maintain information that describes cloud computing environment 130 (e.g., the amount of storage that is available, the cost associated with purchasing storage, the current storage capacity, the maximum storage capacity, or the like). The request received by agent 131 may contain instructions for gathering information that describes cloud computing environment 130 (e.g., instructions to poll cloud computing environment 130 to gather the most recent information). Agent 131 may poll cloud computing environment 130 and may gather the most recent information indicating the current amount of storage that is available, the current cost associated with purchasing storage, the current storage capacity, the maximum storage capacity, or the like. Agent 131 may store the most recently gathered information.

For example, upon polling cloud computing environment 130, agent 131 may determine that the current amount of storage available is "XXX terabytes," the current cost associated with purchasing storage is "$0.XYZ per gigabyte," and that the current storage capacity is "ZZZ terabytes." Agent 131 may store this information and may continue to monitor changes in the information that describes cloud computing environment 130.

At step 209, agent 131 may transmit, to holochain engine 124, the information that describes cloud computing environment 130.

At step 210, holochain engine 124 may receive and store the information from agent 131 that describes cloud computing environment 130. Holochain engine 124 may store the received information in cloud computing environments database 125. Cloud computing environments database 125 may contain a list of the cloud computing environments within multi-cloud computing environment 110 (e.g., cloud computing environment 130 and 140), information that describes each cloud computing environment, and an indication of the cloud computing environment that may store the consumer data. Holochain engine 124 may be associated with a first level of access (e.g., the least restrictive level of access). As such, holochain engine 124 may be permitted to perform a number of actions upon the data within cloud computing environments database 125 (e.g., add new cloud computing environments to the list of existing cloud computing environments, remove cloud computing environments from the list, update the information that describes each cloud computing environment, update the indication of the cloud computing environment that may store the consumer data, or the like). Each one of automatic re-routing engines 150*a* and 150*b* and distributed hash table 160 may be associated with a second level of access (e.g., a level of access that is more restrictive than the first level of access). As such, automatic re-routing engines 150*a* and 150*b* and distributed hash table 160 may be permitted to perform limited actions upon the data within cloud computing environments database 125 (e.g., may only be permitted to view the data).

Figure 2D:
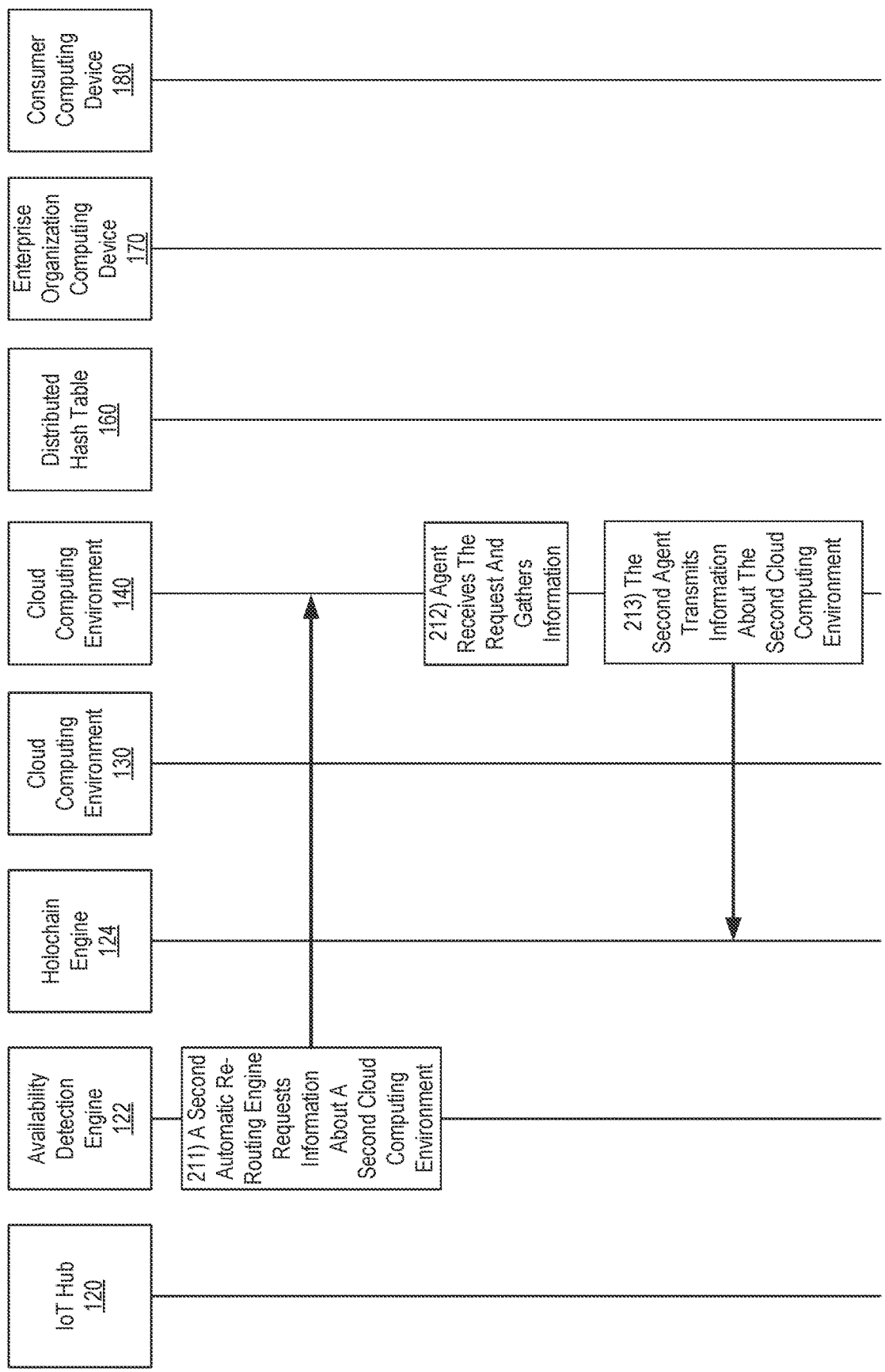

Referring to FIG. 2D, at step 211, availability detection engine 122 may transmit, to a second automatic re-routing engine (e.g., automatic re-routing engine 150*b* since automatic re-routing engine 150*a* may be the first automatic re-routing engine for illustration purposes), a request to gather information about a second cloud computing environment (e.g., cloud computing environments 140 since cloud computing environment 130 may be the first cloud computing environment for illustration purposes).

As described above, each one of automatic re-routing engines 150*a* and 150*b* may correspond to a different cloud computing environment of multi-cloud computing environment 110. For example, automatic re-routing engine 150*a* may correspond to cloud computing environment 130 and automatic re-routing engine 150*b* may correspond to cloud computing environment 140. Therefore, at step 211, availability detection engine 122 may transmit a request to automatic re-routing engine 150*b* to gather information that describes cloud computing environment 140.

At step 212, an agent within cloud computing environment 140 (e.g., agent 141) may receive the request transmitted by automatic re-routing engine 150*b* in step 211. Agent 141 may track and maintain information that describes cloud computing environment 140 (e.g., the amount of storage that is available, the cost associated with purchasing storage, the current storage capacity, the maximum storage capacity, or the like). The request received by agent 141 may contain instructions for gathering information that describes cloud computing environment 140 (e.g., instructions to poll cloud computing environment 140 to gather the most recent information). Agent 141 may poll cloud computing environment 140 and may gather the most recent information indicating the current amount of storage that is available, the current cost associated with purchasing storage, the current storage capacity, the maximum storage capacity, or the like. Agent 141 may store the most recently gathered information.

For example, upon polling cloud computing environment 140, agent 141 may determine that the current amount of storage available is "AABB terabytes," the current cost associated with purchasing storage is "$0.CDEF per megabyte," and that the current storage capacity is "ZZZ gigabytes." Agent 141 may store this information and may continue to monitor changes in the information that describes cloud computing environment 140.

At step 213, agent 141 may transmit, to holochain engine 124, the information that describes cloud computing environment 140.

Figure 2E:
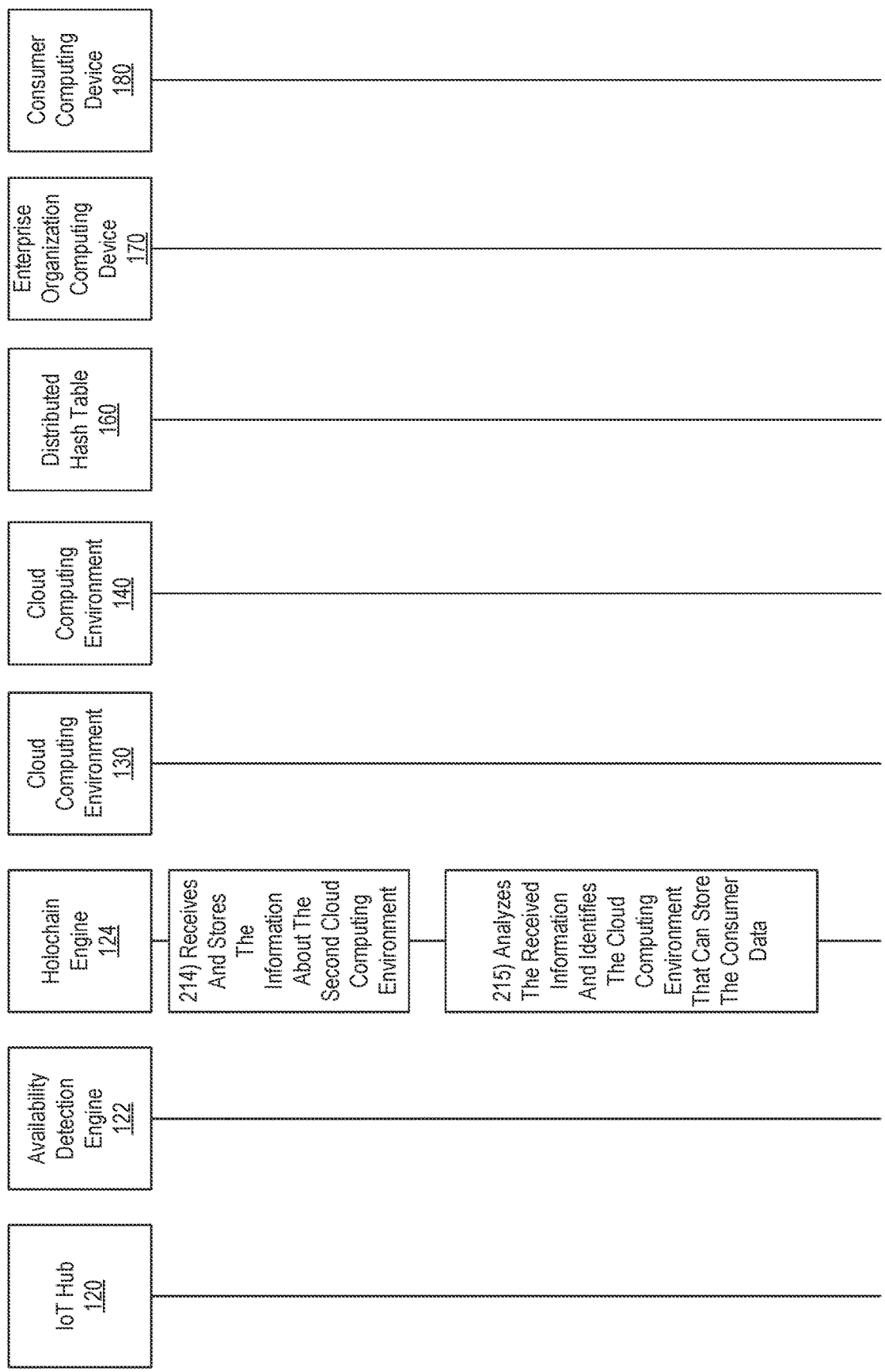

Referring to FIG. 2E, at step 214, holochain engine 124 may receive and store the information from agent 141 that describes cloud computing environment 140. Holochain engine 124 may store the received information in cloud computing environments database 125.

While the present description indicates that holochain engine 124 may receive information that describes two cloud computing environments, in practice holochain engine 124 may receive information that describes each cloud computing environment within multi-cloud computing environment 110. Holochain engine 124 is described as receiving information that describes two cloud computing environments solely for illustration purposes. The methods described herein may be scaled depending on the number of cloud computing environments within multi-cloud computing environment 110.

At step 215, holochain engine 124 may analyze the information received from automatic re-routing engines 150a and 150b using selection criteria. Holochain engine 124 may receive the selection criteria from enterprise organization computing device 170. The selection criteria may indicate the enterprise organization's preferences for identifying a cloud computing environment within which to store the consumer data (e.g., the amount of storage space within a cloud computing environment that the enterprise organization may be interested in purchasing, the enterprise organization's budget for purchasing storage space within a cloud computing environment, or the like). The enterprise organization may be interested in purchasing storage within a cloud computing environment that not only provides cost-efficient storage opportunities, but has capacity to store the consumer data transmitted to enterprise organization computing device 170. Holochain engine 124 may compare the information received from automatic re-routing engines 150a and 150b to the selection criteria to determine whether a cloud computing environment within multi-cloud computing environment 110 satisfies the selection criteria.

For example, the selection criteria may indicate that the enterprise organization may be interested in purchasing "GGG terabytes" and that the enterprise organization may be interested in spending a maximum of "$0.IJKL per terabyte." Holochain engine 124 may compare the enterprise organization's budget to the cost associated with purchasing storage within each of cloud computing environments 130 and 140. Holochain engine 124 may further compare the amount of storage that the enterprise organization would like to purchase to the available storage capacity of each of cloud computing environments 130 and 140.

Holochain engine 124 may determine that a cloud computing environment (e.g., one of cloud computing environments 130 or 140) satisfies the selection criteria. In such instances, holochain engine 124 may determine that the cloud computing environment that satisfies the selection criteria may store the consumer data. For example, holochain engine 124 may identify cloud computing environment 140 as the cloud computing environment that may store the consumer data.

Alternatively or additionally, holochain engine 124 may determine that more than one cloud computing environment (e.g., both of cloud computing environments 130 and 140) satisfies the selection criteria. In such instances, holochain engine 124 may select, from the cloud computing environments that satisfy the selection criteria, a cloud computing environment within which the consumer data may be stored. For example, holochain engine 124 may determine that both cloud computing environments 130 and 140 satisfy the selection criteria, and may select either one of cloud computing environment 130 or cloud computing environment 140 to store the consumer data. For example, holochain engine 124 may identify cloud computing environment 140 as the cloud computing environment that may store the consumer data.

Alternatively, holochain engine 124 may determine that neither one of cloud computing environment 130 nor cloud computing environment 140 satisfies the selection criteria. In such instances, holochain engine 124 may transmit, to enterprise organization computing device 170, a notification indicating that neither one of cloud computing environment 130 nor cloud computing environment 140 satisfies the selection criteria. The notification may request new or modified selection criteria from enterprise organization computing device 170, such that holochain engine 124 may identify a cloud computing environment that may store the consumer data. Holochain engine 124 may receive, from enterprise organization computing device 170, new or modified selection criteria. Holochain engine 124 may compare the information received from automatic re-routing engines 150a and 150b to the new or modified selection criteria to identify a cloud computing environment within which the consumer data may be stored. Holochain engine 124 may continuously request new or modified selection criteria from enterprise organization computing device 170 until holochain engine 124 is able to identify a cloud computing environment that may store the consumer data.

For example, holochain engine 124 may determine that neither one of cloud computing environment 130 nor cloud computing environment 140 satisfies the selection criteria. Holochain engine 124 may notify enterprise organization computing device 170 and may request, from enterprise organization computing device 170, new or modified selection criteria. Upon comparing the information received from automatic re-routing engines 150a and 150b to modified selection criteria, holochain engine 124 may determine that cloud computing environment 140 satisfies the selection criteria. As such, holochain engine 124 may identify cloud computing environment 140 as the cloud computing environment that may store the consumer data.

Referring to FIG. 2F, at step 216, holochain engine 124 may transmit, to each of automatic re-routing engines 150a and 150b, a notification indicating the cloud computing environment that may store the consumer data such that each one of automatic re-routing engines 150a and 150b may be aware of the location of the consumer data. For example, holochain engine 124 may transmit a notification to automatic re-routing engines 150a and 150b indicating that cloud computing environment 140 satisfied the selection criteria and that cloud computing environment 140 may store the consumer data.

At step 217, holochain engine 124 may retrieve, from consumer data database 121, the consumer data. Consumer data database 121 may contain the entirety of the consumer data received from enterprise organization computing device 170.

At step 218, holochain engine 124 may transmits, to validation engine 126 of holochain engine 124, the consumer data and a request for validation engine 126 to validate the consumer data.

Referring to FIG. 2G, at step 219, validation engine 126 may receive the consumer data and the request from holochain engine 124, and may determine whether the consumer data satisfies validation criteria. Validation engine 126 may receive the validation criteria from enterprise organization computing device 170. The validation criteria may indicate criteria for determining whether the consumer data may proceed to encryption engine 128 and whether the consumer data may be stored in a cloud computing environment of multi-cloud computing environment 110 (e.g., whether the consumer data is corrupted, whether the consumer data contains blank data entries, whether components of the consumer data contain malicious data, or the like). The enterprise organization may be interested in encrypting and storing only the consumer data that satisfies the validation criteria (e.g., the consumer data that is not corrupted, the consumer data that contains populated data entries, the consumer data that does not contain malicious data, or the like). Validation engine 126 may compare the consumer data to the validation criteria.

At step 220a, validation engine 126 may determine that the consumer data fails to satisfy the validation criteria. In such instances, validation engine 126 may transmit the consumer data to logging engine 127 of holochain engine 124.

For example, the validation criteria may indicate that the consumer data may be removed from the processes described herein if the consumer data contains corrupted data, blank data entries, malicious data, or the like. Validation engine 126 may examine each component of the consumer data to determine whether each component is populated, whether the data within each component is corrupted, and whether the data within each component is malicious data. Validation engine 126 may determine that at least one component of the consumer data contains corrupted data and, as such, the entirety of the consumer day may fail to satisfy the validation criteria. Validation engine 126 may transmit, to logging engine 127, the consumer data and the failed validation criteria, as discussed in further detail in steps 222 and 223.

Figure 2H:
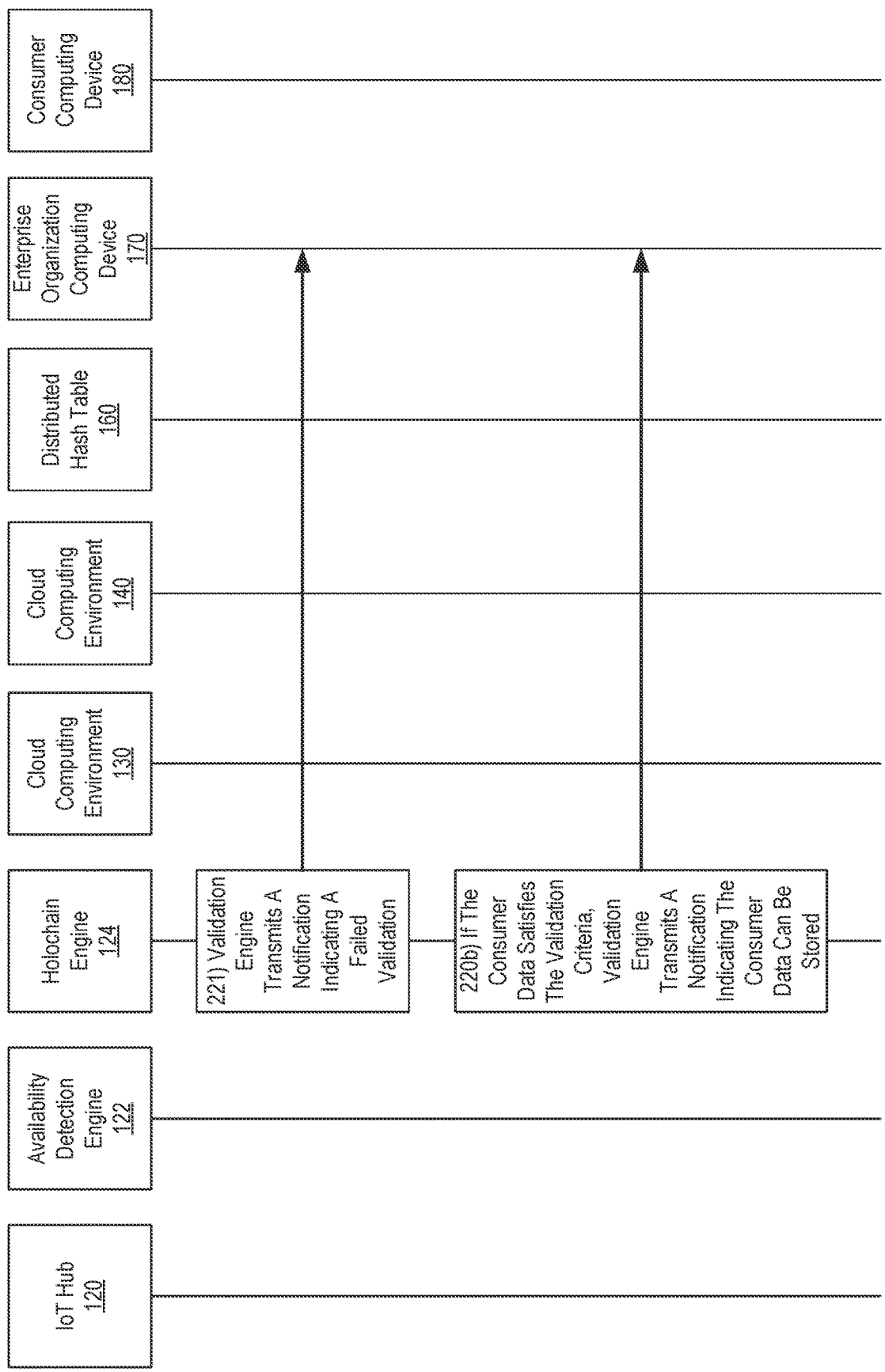

Referring to FIG. 2H, at step 221, validation engine 126 may transmit a notification to enterprise organization computing device 170 indicating that the consumer data failed to satisfy the validation criteria. The notification may further indicate that the consumer data may be transmitted to logging engine 127, wherein logging engine 127 may analyze the consumer data and the failed validation criteria to determine why the consumer data failed to satisfy the validation criteria, as discussed in step 221.

Alternatively, validation engine 126 may determine that the consumer data satisfies the validation criteria and, at step 220b, validation engine 126 may transmit a notification to enterprise organization computing device 170 indicating that the consumer data successfully satisfied the validation criteria. The notification may further indicate that the consumer data may proceed to encryption engine 128 for encryption before being stored in the cloud computing environment identified by holochain engine 124, as discussed in further detail in step 224.

For example, the validation criteria may indicate that the consumer data may be removed from the processes described herein if the consumer data contains corrupted data, blank data entries, malicious data, or the like. Validation engine 126 may examine each component of consumer data to determine whether each component is populated, whether the data within each component is corrupted, and whether the data within each component is malicious data. Validation engine 126 may determine that each component of the consumer data satisfies the validation criteria. Validation engine 126 may transmit, to enterprise organization computing device 170, a notification indicating that the consumer data may be stored in cloud computing environment 140, as determined by holochain engine 124 in step 215.

Figure 2I:
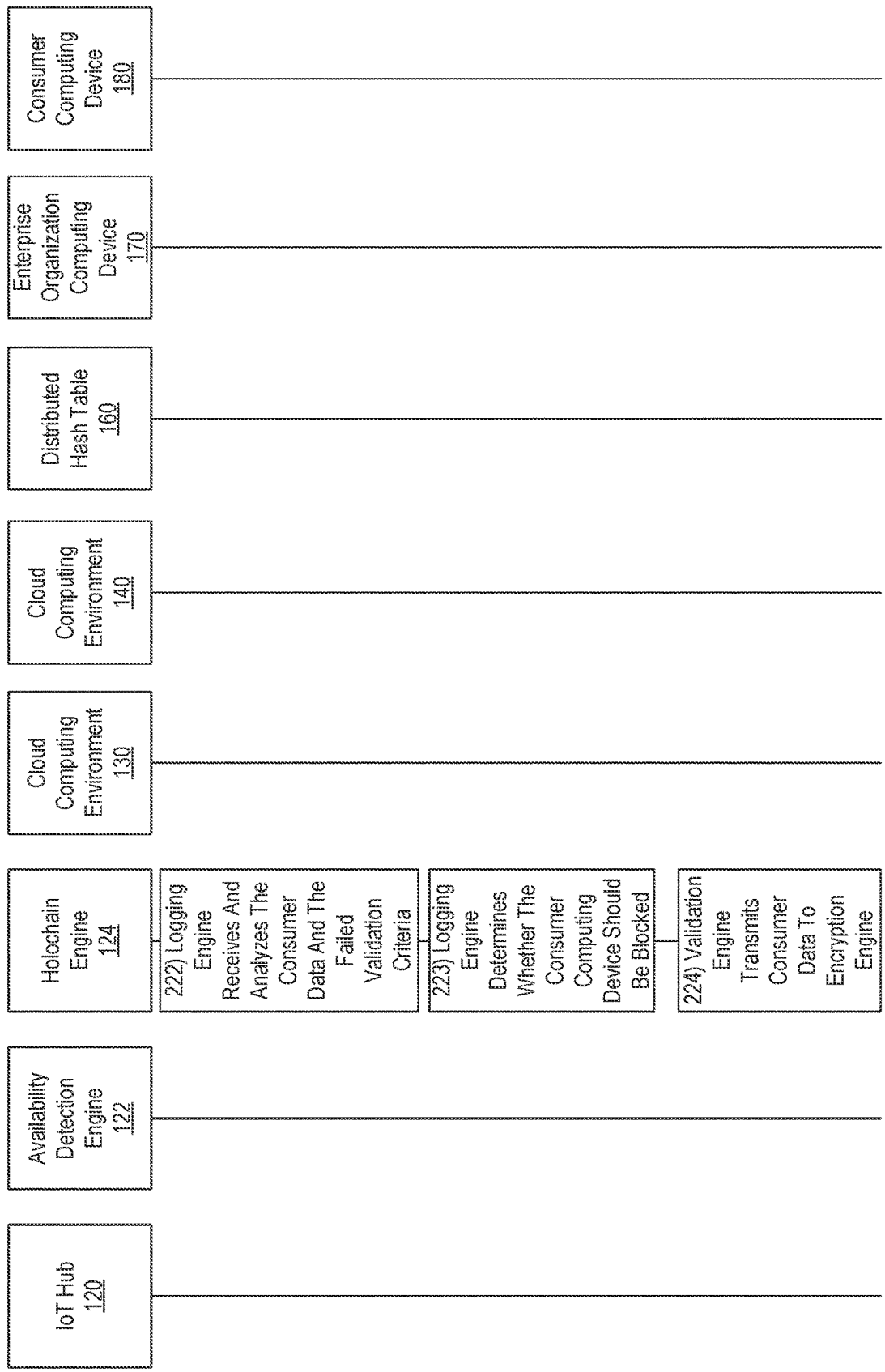

As discussed in connection with step 220a and referring to FIG. 2I, at step 222, logging engine 127 may receive, from validation engine 126, the consumer data and the failed validation criteria. Logging engine 127 may analyze the consumer data and the failed validation criteria to determine the reason(s) that the consumer data failed to satisfy the validation criteria. For example, the failed validation criteria may indicate that components of the consumer data contain corrupted consumer data. Logging engine 127 may further analyze the corrupted consumer data and may determine that the corrupted consumer data contains malicious data. As such, logging engine 127 may determine that the consumer data failed to satisfy the validation criteria due to the malicious data within components of the consumer data.

At step 223 logging engine 127 may determine whether to prohibit the consumer or consumer device associated with the consumer data (e.g., consumer computing device 180) from transmitting consumer data to enterprise organization computing device 170 in the future. Logging engine 127 may determine whether to prohibit the consumer or consumer device from transmitting consumer data depending on the reason(s) that the consumer data failed to satisfy the validation criteria (e.g., whether the consumer transmitted malicious data, whether the consumer transmitted blank data entries, whether the consumer transmitted corrupted data, or the like). For example, as discussed in step 222, logging engine 127 may determine that the consumer data failed to satisfy the validation criteria due to malicious data within components of the consumer data. Since components of the consumer data contain malicious data, logging engine 127 may prohibit consumer computing device 180 from transmitting further consumer data to enterprise organization computing device 170 to reduce the likelihood of storing malicious data within a cloud computing environment.

As discussed in connection with step 220b, at step 224, validation engine 126 may transmit the consumer data to encryption engine 128 of holochain engine 124. Referring to FIG. 2J, at step 225, encryption engine 128 may receive the consumer data.

At step 226, encryption engine 128 may generate public and private key pairs, wherein the public keys may be used to encrypt the consumer data and the private keys may be used to access the encrypted consumer data. Encryption engine 128 may store public and private key pairs in key pair database 129. Encryption engine 128 may be associated with a first level of access (e.g., the least restrictive level of access). As such, encryption engine 128 may perform actions upon the key pairs within key pair database 129 (e.g., add new key pairs, remove key pairs, update key pairs, re-organize key pairs, or the like). Enterprise organization computing device 170 may be associated with a second level of access (e.g., a more restrictive level of access than the first level of access). As such, enterprise organization computing device 170 may perform limited actions upon the key pairs within key pair database 129 (e.g., may only be permitted to view the key pairs).

At step 227, encryption engine 128 may encrypt the consumer data using the public key generated in step 226.

Referring to FIG. 2K, at step 228, encryption engine 128 may transmit the encrypted consumer data to distributed hash table 160. Distributed hash table 160 may provide an organizational system for tracking the cloud computing environment that stores the encrypted consumer data and the private key that may be used to access the encrypted consumer data. Encryption engine 128 may further transmit, to distributed hash table 160, the private key that corresponds to the public key that was used to encrypt the consumer data.

At step 229, distributed hash table 160 may receive and store the encrypted consumer data and the private key within the table.

At step 230, encryption engine 128 may transmit, to enterprise organization computing device 170, the private key that corresponds to the public key that was used to encrypt the consumer data.

At step 231, enterprise organization computing device 170 may receive and store the private key. Enterprise organization computing device 170 may use the private key to request access to the encrypted consumer data. To request access to the encrypted consumer data, enterprise organization computing device 170 may transmit, to distributed hash table 160, a request to access the encrypted consumer data, wherein the request may indicate the private key that corresponds to the public key that was used to encrypt the consumer data. Distributed hash table 160 may compare the private key received from enterprise organization computing device 170 to the private key stored in the hash table. Distributed hash table 160 may allow enterprise organization computing device 170 to access the encrypted consumer data if the private keys match. However, if the private key within the request from enterprise organization computing device 170 fails to match the private key that corresponds to the public key that was used to encrypt the consumer data, distributed hash table 160 may deny the request to access the encrypted consumer data.

Figure 2L:
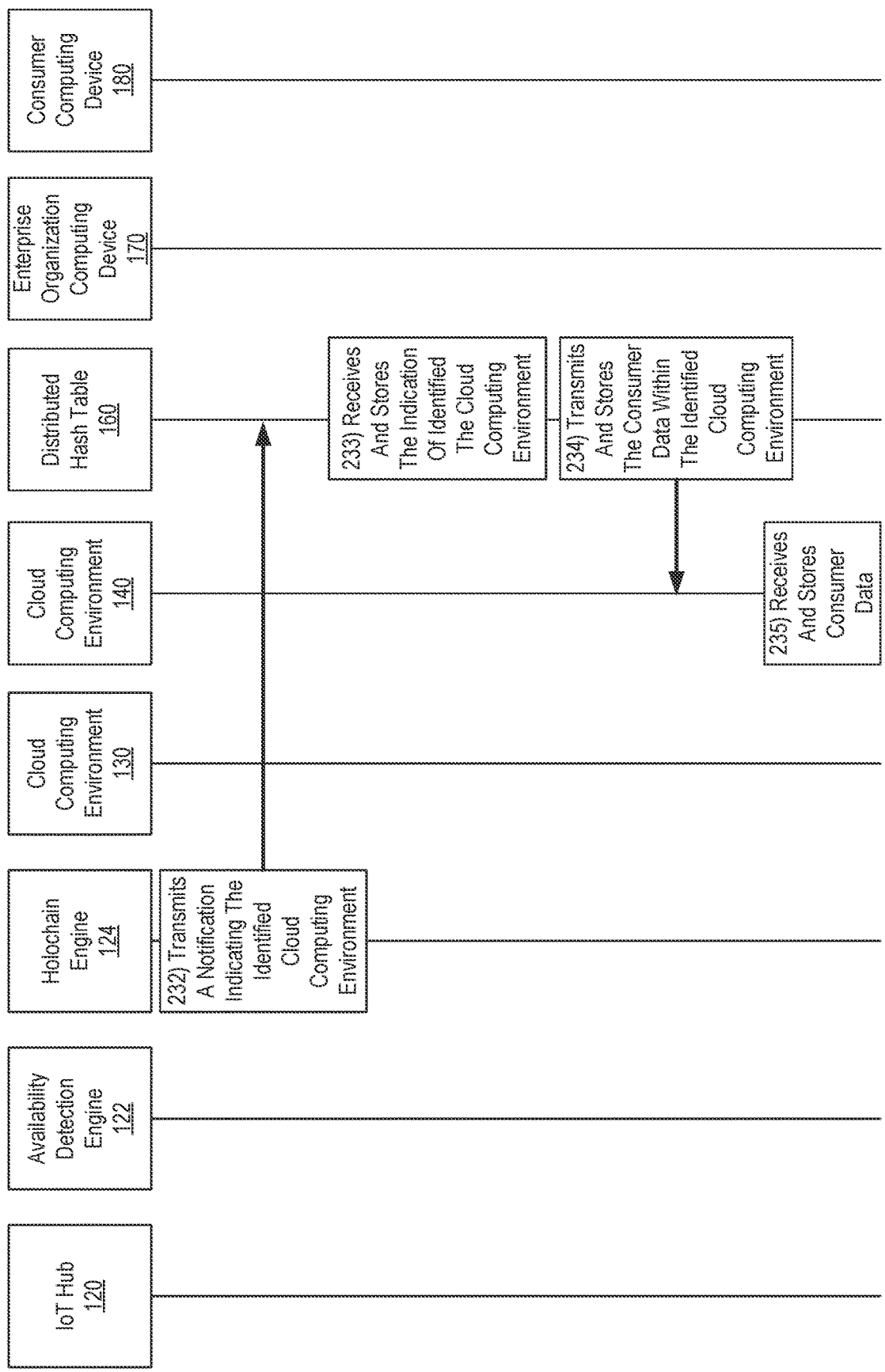

Referring to FIG. 2L, at step 232, holochain engine 124 may transmit, to distributed hash table 160, a notification indicating the cloud computing environment that may store the consumer data, as discussed in connection with step 215.

At step 233, distributed hash table 160 may receive and store, within the table, the indication of the cloud computing environment that may store the encrypted consumer data. For example, as discussed in the example in step 215, holochain engine 124 may determine that cloud computing environment 140 may store the consumer data since cloud computing environment 140 satisfied the selection criteria. Therefore, for example, at step 233, distributed hash table 160 may indicate, within the table, that cloud computing environment 140 may store the encrypted consumer data.

At step 234, distributed hash table 160 may transmit the encrypted consumer data to the cloud computing environment that may store the encrypted consumer data, as indicated by holochain engine 124 in step 215. For example, as discussed in the example in step 215, holochain engine 124 may determine that cloud computing environment 140 may store the consumer data since cloud computing environment 140 satisfied the selection criteria. Therefore, for example, at step 234, distributed hash table 160 may transmit the encrypted consumer data, received in step 229, to cloud computing environment 140.

At step 235, the cloud computing environment that satisfied the selection criteria, as indicated by holochain engine 124 in step 215, may receive and store the consumer data. For example, holochain engine 124 may determine in step 215 that cloud computing environment 140 satisfies the selection criteria and may store the consumer data. Therefore, for example, at step 235, cloud computing environment 140 may receive and store the consumer data.

Figure 3A:
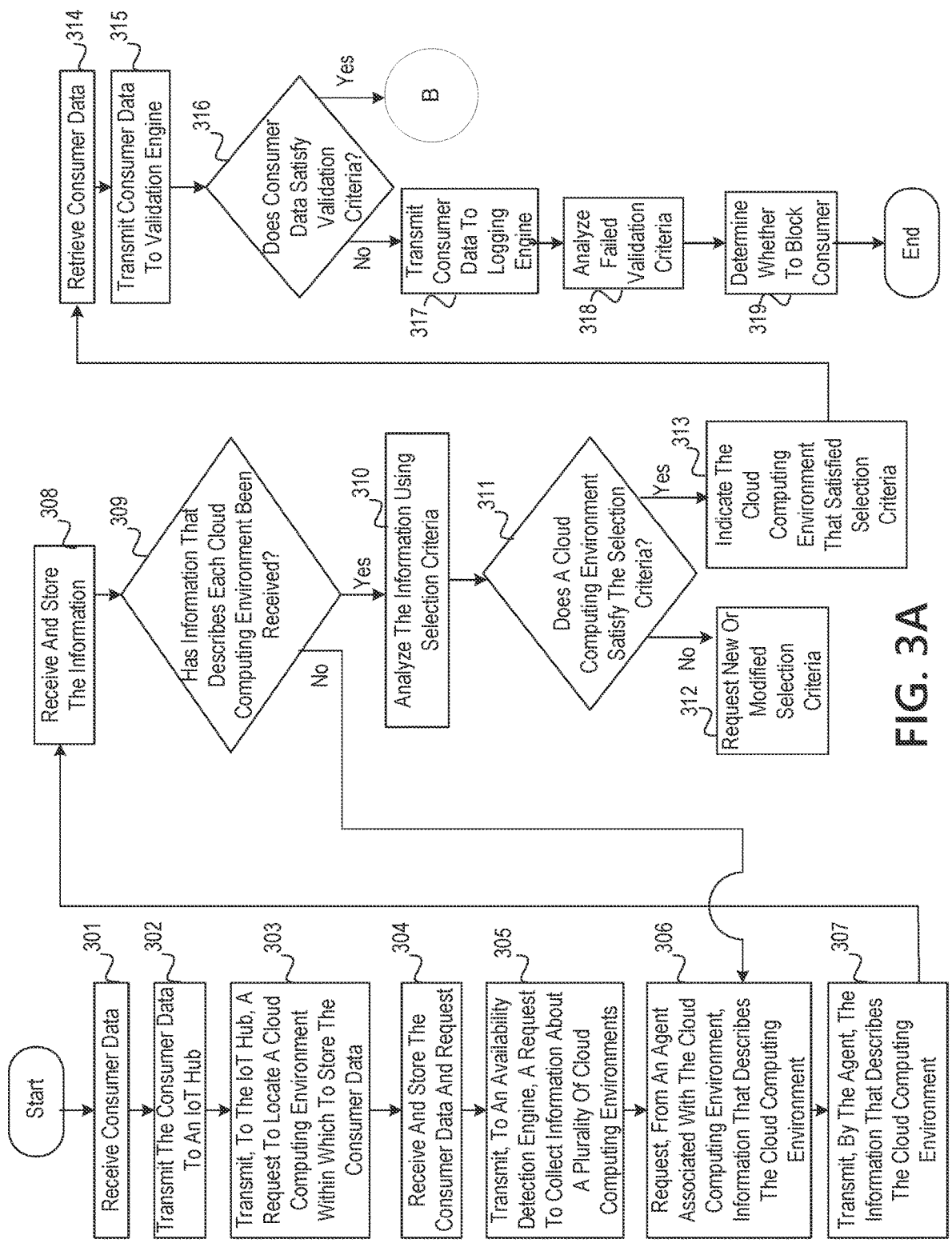
FIGS. 3A-3B depict an illustrative method for automatically re-routing multi-cloud holochain data ingestion based on network architecture availability to internet of things (IoT) devices in accordance with one or more example embodiments.
Figure 3B:
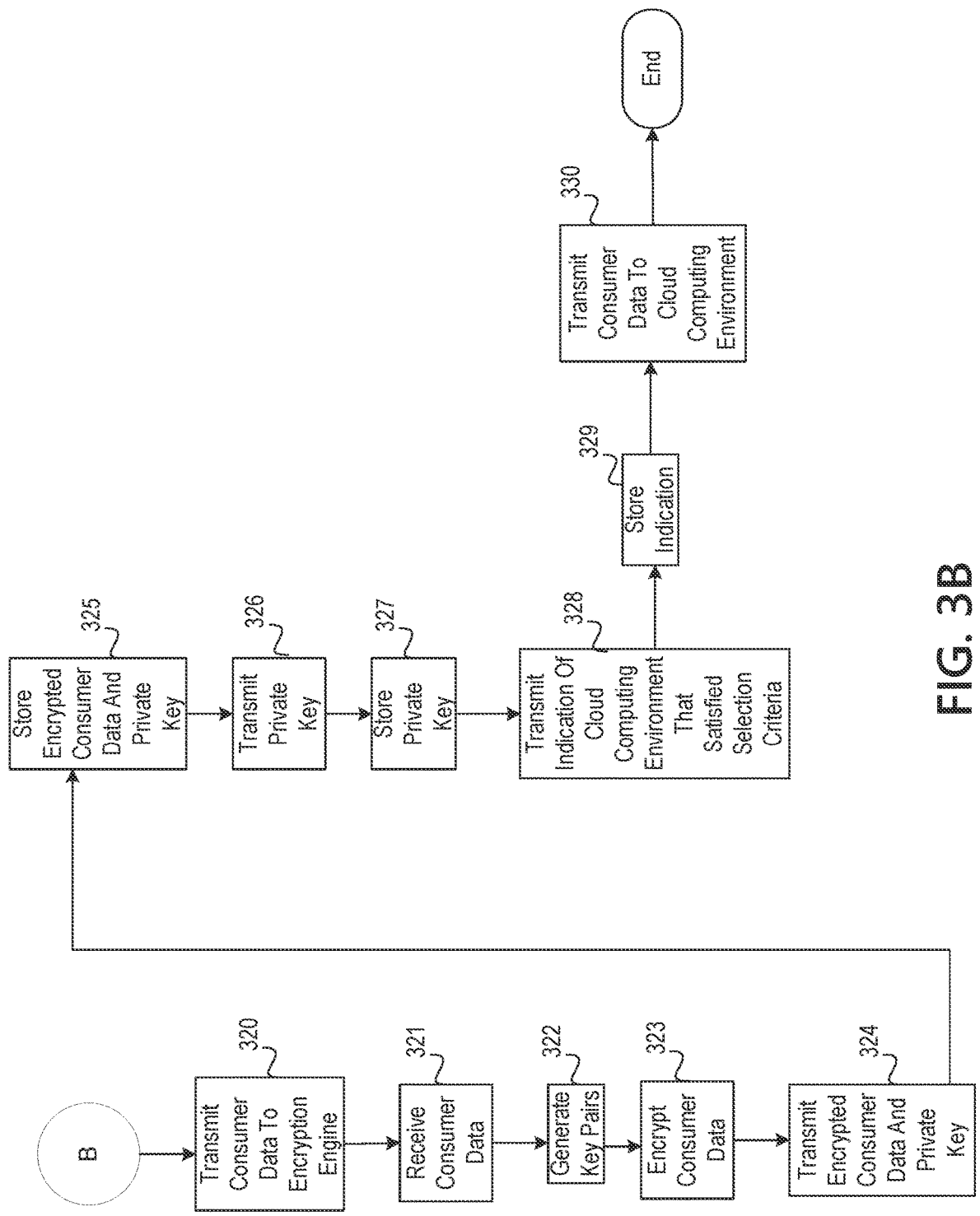

FIGS. 3A and 3B depict flow diagrams illustrating one example method for automatically re-routing multi-cloud holochain data ingestion based on network architecture availability for IoT devices in accordance with one or more aspects described herein. The processes illustrated in FIGS. 3A and 3B are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIGS. 3A and 3B may be performed in real-time or near real-time.

Referring to FIG. 3A, at step 301, enterprise organization computing device 170 may receive consumer data from consumer computing device 180. Consumer computing device 180 may generate consumer data. Consumer computing device 180 may be a device that is connected to the internet of things (e.g., an IoT device). By connecting to the IoT, consumer computing device 180 may communicate with other computing devices that are connected to the IoT. Consumer computing device 180 may generate consumer data by transmitting communication to and receiving communication from other computing devices connected to the IoT.

At step 302, enterprise organization computing device 170 may transmit, to IoT hub 120, the received consumer data. Enterprise organization computing device 170 may transmit (e.g., continuously, in batches, or the like) consumer data to IoT hub 120 such that the entirety of the consumer data received by enterprise organization computing device 170 may be stored within a cloud computing environment of multi-cloud computing environment 110, as opposed to local storage on physical computing devices within the enterprise organization.

At step 303, enterprise organization computing device 170 may transmit, to IoT hub 120, a request to store the consumer data within a cloud computing environment of multi-cloud computing environment 110 (e.g., one of cloud computing environments 130 or 140).

At step 304, IoT hub 120 may receive and store the consumer data from enterprise organization computing device 170. IoT hub 120 may further receive and store the request to store the consumer data within a cloud computing environment of multi-cloud computing environment 110. IoT hub 120 may store the consumer data in consumer data database 121. Consumer data database 121 may contain the entirety of the consumer data received by IoT hub 120 and from enterprise organization computing device 170. IoT hub 120 may be associated with a first level of access (e.g., a least restrictive level of access). As such, IoT hub 120 may be permitted to perform a number of actions upon the data within consumer data database 121 (e.g., add new consumer data, remove consumer data, update consumer data, re-organize consumer data, or the like).

IoT hub 120 may review the request from enterprise organization computing device 170 and, at step 305, IoT hub 120 may transmit, to availability detection engine 122, a request to gather information that describes each cloud computing environment of multi-cloud computing environment 110 (e.g., cloud computing environments 130 and 140). Availability detection engine 122 may transmit, to an automatic re-routing engine (e.g., any one of automatic re-routing engines 150a or 150b), a request to gather information about a cloud computing environment (e.g., one of cloud computing environments 130 or 140). Each one of automatic re-routing engines 150a and 150b may correspond to a different cloud computing environment of multi-cloud computing environment 110. For example, automatic re-routing engine 150a may correspond to cloud computing environment 130 and automatic re-routing engine 150b may correspond to cloud computing environment 140.

At step 306, an automatic re-routing engine (e.g., either one of automatic re-routing engines 150a or 150b) may transmit, to an agent associated a cloud computing environment (e.g., agent 131 associated with cloud computing environment 130 or agent 141 associated with cloud computing environment 140), a request for information that describes the corresponding cloud computing environment. An agent (e.g., either one of agents 131 or 141) may track and maintain information that describes the corresponding cloud computing environment (e.g., either cloud computing environment 130 or cloud computing environment 140). The agent may track and monitor, for each cloud computing environment within multi-cloud computing environment 110, the amount of storage that is available, the cost associated with purchasing storage, the current storage capacity, the maximum storage capacity, or the like. The agent may gather the most recent information describing each cloud computing environment within multi-cloud computing environment 110 and may store the most recently gathered information.

At step 307, the agent (e.g., either one of agents 131 or 141) may transmit, to holochain engine 124, the information that describes each cloud computing environment of multi-cloud computing environment 110 (e.g., each of cloud computing environment 130 and cloud computing environment 140).

At step 308, holochain engine 124 may receive and store the information transmitted from the agent (e.g., either one of agents 131 or 141) in step 307. Holochain engine 124 may store the received information in cloud computing environments database 125. Cloud computing environments database 125 may contain a list of the cloud computing environments within multi-cloud computing environment 110 (e.g., cloud computing environment 130 and 140), information that describes each cloud computing environment, and an indication of the cloud computing environment that may store the consumer data. Holochain engine 124 may be associated with a first level of access (e.g., the least restrictive level of access). As such, holochain engine 124 may be permitted to perform a number of actions upon the data within cloud computing environments database 125 (e.g., add new cloud computing environments to the list of existing cloud computing environments, remove cloud computing environments from the list, update the information that describes each cloud computing environment, update the indication of the cloud computing environment that may store the consumer data, or the like). Each one of automatic re-routing engines 150a and 150b and distributed hash table 160 may be associated with a second level of access (e.g., a level of access that is more restrictive than the first level of access). As such, automatic re-routing engines 150a and 150b and distributed hash table 160 may be permitted to perform limited actions upon the data within cloud computing environments database 125 (e.g., may only be permitted to view the data).

At step 309, holochain engine 124 may determine whether it has received information that describes each cloud computing environment of multi-cloud computing environment 110 (e.g., information that describes both cloud computing environment 130 and cloud computing environment 140). If holochain engine 124 determines that it might not have received information that describes each cloud computing environment of multi-cloud computing environment 110, then holochain engine 124 may repeat steps 306 to 309 until holochain engine 124 determines that it has received information that describes each cloud computing environment of multi-cloud computing environment 110.

Alternatively, if, at step 309, holochain engine 124 determines that it has received information that describes each cloud computing environment of multi-cloud computing environment 110, then, at step 310, holochain engine 124 may analyze the information that describes each cloud computing environment of multi-cloud computing environment 110 using selection criteria. Holochain engine 124 may receive the selection criteria from enterprise organization computing device 170. The selection criteria may indicate the enterprise organization's preferences for identifying a cloud computing environment within which to store the consumer data (e.g., the amount of storage space within a cloud computing environment that the enterprise organization may be interested in purchasing, the enterprise organization's budget for purchasing storage space within a cloud computing environment, or the like). Holochain engine 124 may compare the information received in step 308 to the selection criteria to determine whether a cloud computing environment within multi-cloud computing environment 110 satisfies the selection criteria.

At step 311, holochain engine 124 may determine whether a cloud computing environment within multi-cloud computing environment 110 satisfies the selection criteria. If holochain engine 124 determines that neither one of cloud computing environment 130 nor cloud computing environment 140 satisfies the selection criteria, then, at step 312, holochain engine 124 may transmit, to enterprise organization computing device 170, a request for new or modified selection criteria. Holochain engine 124 may repeat steps 310 to 312 until holochain engine 124 determines that a cloud computing environment within multi-cloud computing environment 110 satisfies the selection criteria.

Upon determining that a cloud computing environment within multi-cloud computing environment 110 satisfies the selection criteria, then, at step 313, holochain engine 124 may identify the cloud computing environment of multi-cloud computing environment 110 that satisfies the selection criteria (e.g., either one of cloud computing environment 130 or cloud computing environment 140). Holochain engine 124 may transmit, to each of automatic re-routing engines 150a and 150b, a notification indicating the cloud computing environment that satisfied the selection criteria and, as such, may store the consumer data such that each one of automatic re-routing engines 150a and 150b may be aware of the location of the consumer data.

At step 314, holochain engine 124 may retrieve, from consumer data database 121, the consumer data. Consumer data database 121 may contain the entirety of the consumer data received from enterprise organization computing device 170.

At step 315, holochain engine 124 may transmit the consumer data to validation engine 126 of holochain engine 124.

At step 316, validation engine 126 may determine whether the consumer data satisfies validation criteria. Validation engine 126 may receive the validation criteria from enterprise organization computing device 170. The validation criteria may indicate criteria for determining whether the consumer data may proceed to encryption engine 128 and whether the consumer data may be stored in a cloud computing environment of multi-cloud computing environment 110 (e.g., whether the consumer data is corrupted, whether the consumer data contains blank data entries, whether components of the consumer data contain malicious data, or the like). The enterprise organization may be interested in encrypting and storing only the consumer data that satisfies the validation criteria (e.g., the consumer data that is not corrupted, the consumer data that contains populated data entries, the consumer data that does not contain malicious data, or the like). Validation engine 126 may compare the consumer data to the validation criteria.

Validation engine 126 may determine that the consumer data fails to satisfy the validation criteria and, at step 317, validation engine 126 may transmit the consumer data and the failed validation criteria to logging engine 127. At step 318, logging engine 127 may analyze the consumer data and the failed validation criteria to determine the reason(s) that the consumer data failed to satisfy the validation criteria. For example, the failed validation criteria may indicate that components of the consumer data contain corrupted consumer data. Logging engine 127 may further analyze the corrupted consumer data and may determine that the corrupted consumer data contains malicious data. As such, logging engine 127 may determine that the consumer data failed to satisfy the validation criteria due to the malicious data within components of the consumer data.

At step 319, logging engine 127 may determine whether to prohibit the consumer or consumer device associated with the consumer data (e.g., consumer computing device 180) from transmitting consumer data to enterprise organization computing device 170 in the future. Logging engine 127 may determine whether to prohibit the consumer or consumer device from transmitting consumer data depending on the reason(s) that the consumer data failed to satisfy the validation criteria (e.g., whether the consumer transmitted malicious data, whether the consumer transmitted blank data entries, whether the consumer transmitted corrupted data, or the like). For example, as discussed in step 318, logging engine 127 may determine that the consumer data failed to satisfy the validation criteria due to malicious data within components of the consumer data. Since components of the consumer data contain malicious data, logging engine 127 may prohibit consumer computing device 180 from transmitting further consumer data to enterprise organization computing device 170 to reduce the likelihood of storing malicious data within a cloud computing environment.

Alternatively, at step 316, validation engine 126 may determine that the consumer data satisfies the validation criteria and, referring to FIG. 3B at step 320, may transmit the consumer data to encryption engine 128. At step 321, encryption engine 128 may receive the consumer data.

At step 322, encryption engine 128 may generate public and private key pairs, wherein the public keys may be used to encrypt the consumer data and the private keys may be used to access the encrypted consumer data. Encryption engine 128 may store public and private key pairs in key pair database 129. Key pair database 129 may contain the public and private key pairs generated by encryption engine 128. Encryption engine 128 may be associated with first level of access (e.g., the least restrictive level of access). As such, encryption engine 128 may perform actions upon the key pairs within key pair database 129 (e.g., add new key pairs, remove key pairs, update key pairs, re-organize key pairs, or the like). Enterprise organization computing device 170 may be associated with a second level of access (e.g., a more restrictive level of access than the first level of access). As such, enterprise organization computing device 170 may perform limited actions upon the key pairs within key pair database 129 (e.g., may only be permitted to view the key pairs).

At step 323, encryption engine 128 may encrypt the consumer data using the public key generated in step 322. At step 324, encryption engine 128 may transmit the encrypted consumer data to distributed hash table 160. Distributed hash table 160 may provide an organizational system for tracking the cloud computing environment that stores the encrypted consumer data and the private key that may be used to access the encrypted consumer data. Encryption engine 128 may further transmit, to distributed hash table 160, the private key that corresponds to the public key that was used to encrypt the consumer data.

At step 325, distributed hash table 160 may receive and store the encrypted consumer data and the private key within the table.

At step 326, encryption engine 128 may transmit, to enterprise organization computing device 170, the private key that corresponds to the public key that was used to encrypt the consumer data. At step 327, enterprise organization computing device 170 may receive and store the private key. To request access to the encrypted consumer data, enterprise organization computing device 170 may transmit, to distributed hash table 160, a request to access the encrypted consumer data, wherein the request may indicate the private key that corresponds to the public key that was used to encrypt the consumer data. Distributed hash table 160 may compare the private key received from enterprise organization computing device 170 to the private key stored in the hash table. Distributed hash table 160 may allow enterprise organization computing device 170 to access the encrypted consumer data if the private keys match. However, if the private key within the request from enterprise organization computing device 170 fails to match the private key that corresponds to the public key that was used to encrypt the consumer data, distributed hash table 160 may deny the request to access the encrypted consumer data.

At step 328, holochain engine 124 may transmit, to distributed hash table 160, a notification indicating the cloud computing environment (e.g., one of cloud computing environments 130 or 140) that satisfied the selection criteria and, as such, may store the consumer data, as discussed in step 313. At step 329, distributed hash table 160 may receive and store, within the table, the indication of the cloud computing environment that may store the encrypted consumer data. At step 330, distributed hash table 160 may transmit the encrypted consumer data to the cloud computing environment that may store the encrypted consumer data, as indicated by holochain engine 124 in step 313.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a consumer computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a computing device configured to operate within a multi-cloud computing environment and including at least one or more processors and memory:
   receiving, by an IoT hub and from an enterprise organization, a request to store consumer data;
   instructing, by the IoT hub, an availability detection engine to identify a cloud computing environment, of a plurality of cloud computing environments within the multi-cloud computing environment to store the consumer data;
   transmitting, by a plurality of automatic re-routing engines and to a holochain engine, information that describes the plurality of cloud computing environments, wherein a number of automatic re-routing engines in the plurality of automatic re-routing engines corresponds to a number of cloud computing environments in the plurality of cloud computing environments and wherein each automatic re-routing engine of the plurality of automatic re-routing engines corresponds to a different cloud computing environment of the plurality of cloud computing environments;
   identifying, by the holochain engine and based on the information, the cloud computing environment of the plurality of cloud computing environments to store the consumer data;
   determining, by a validation engine, whether the consumer data satisfies validation criteria; and
   based on determining that the consumer data fails to satisfy the validation criteria:
   requesting additional validation criteria;
   determining whether the consumer data satisfies the additional validation criteria;
   based on determining that the consumer data fails to satisfy the additional validation criteria, transmitting the consumer data to a logging engine; and
   based on determining that the consumer data successfully satisfies one of: the validation criteria or the additional validation criteria, transmitting the consumer data to an encryption engine and a distributed hash table.

2. The method of claim 1, wherein the information comprises at least one of:
   storage availability;
   a cost associated with storage;
   a current storage capacity; or
   a maximum storage capacity.

3. The method of claim 1, wherein the identifying further comprises:
   comparing, by the holochain engine, the information corresponding to each cloud computing environment; and
   identifying, by the holochain engine, the cloud computing environment of the plurality of cloud computing environments that satisfies selection criteria, wherein the selection criteria comprises at least one of:
   a budget for purchasing storage within the cloud computing environment; or
   an amount of storage needed to store the consumer data.

4. The method of claim 1, further comprising:
   analyzing, by the logging engine, the consumer data and failed validation criteria;
   identifying, by the logging engine, a consumer device associated with the consumer data; and
   determining, based on the analyzing, whether the consumer should be blocked from transmitting the consumer data to the enterprise organization.

5. The method of claim 1, further comprising:
   generating, by the encryption engine, keys pairs comprising a public key and a private key;
   encrypting, by the encryption engine, the consumer data using the public key; and
   transmitting, by the encryption engine and to the distributed hash table, the private key and the encrypted consumer data.

6. The method of claim 5, further comprising storing, by the distributed hash table and within the identified cloud computing environment, the encrypted consumer data.

7. The method of claim 1 further comprising transmitting, to the enterprise organization, a notification indicating one of:
   a successful validation of the consumer data; or
   a failed validation of the consumer data.

8. A computing platform comprising:
   a computing device configured to operate within a multi-cloud computing environment;
   at least one processor;
   a communication interface communicatively coupled to the at least one processor; and
   memory storing computer-readable instructions that, when executed, cause the computing platform to:
   receive, by an IoT hub and from an enterprise organization, a request to store consumer data;
   instruct, by the IoT hub, an availability detection engine to identify a cloud computing environment, of a plurality of cloud computing environments within the multi-cloud computing environment to store the consumer data;

transmit, by a plurality of automatic re-routing engines and to a holochain engine, information that describes the plurality of cloud computing environments, wherein a number of automatic re-routing engines in the plurality of automatic re-routing engines corresponds to a number of cloud computing environments in the plurality of cloud computing environments and wherein each automatic re-routing engine of the plurality of automatic re-routing engines corresponds to a different cloud computing environment of the plurality of cloud computing environments;

identify, by the holochain engine and based on the information, the cloud computing environment of the plurality of cloud computing environments to store the consumer data;

determine, by a validation engine, whether the consumer data satisfies validation criteria; and based on determining that the consumer data fails to satisfy the validation criteria:
request additional validation criteria;
determine whether the consumer data satisfies the additional validation criteria; and
based on determining that the consumer data fails to satisfy the additional validation criteria, transmit the consumer data to a logging engine; and based on determining that the consumer data successfully satisfies one of: the validation criteria or the additional validation criteria, transmit the consumer data to an encryption engine and a distributed hash table.

9. The computing platform of claim 8, wherein the information comprises at least one of:
storage availability;
a cost associated with storage;
a current storage capacity; or
a maximum storage capacity.

10. The computing platform of claim 8, wherein the identifying further causes the computing platform to:
compare, by the holochain engine, the information corresponding to each cloud computing environment; and
identify, by the holochain engine, the cloud computing environment of the plurality of cloud computing environments that satisfies selection criteria, wherein the selection criteria comprises at least one of:
a budget for purchasing storage within the cloud computing environment; or
an amount of storage needed to store the consumer data.

11. The computing platform of claim 8, wherein the instructions, when executed, further cause the computing platform to:
analyze, by the logging engine, the consumer data and failed validation criteria;
identify, by the logging engine, a consumer device associated with the consumer data; and
determine, based on the analyzing, whether the consumer should be blocked from transmitting the consumer data to the enterprise organization.

12. The computing platform of claim 8, wherein the instructions, when executed, further cause the computing platform to:
generate, by the encryption engine, keys pairs comprising a public key and a private key;
encrypt, by the encryption engine, the consumer data using the public key; and transmit, by the encryption engine and to the distributed hash table, the private key and the encrypted consumer data.

13. The computing platform of claim 12, wherein the instructions, when executed, further cause the computing platform to store, by the distributed hash table and within the identified cloud computing environment, the encrypted consumer data.

14. One or more non-transitory computer-readable media storing instructions that, when executed by a computing platform comprising a computing device configured to operate within a multi-cloud computing environment, at least one processor, memory, and a communication interface, cause the computing platform to:

receive, by an IoT hub and from an enterprise organization, a request to store consumer data;

instruct, by the IoT hub, an availability detection engine to identify a cloud computing environment, of a plurality of cloud computing environments within the multi-cloud computing environment to store the consumer data;

transmit, by a plurality of automatic re-routing engines and to a holochain engine, information that describes the plurality of cloud computing environments, wherein a number of automatic re-routing engines in the plurality of automatic re-routing engines corresponds to a number of cloud computing environments in the plurality of cloud computing environments and wherein each automatic re-routing engine of the plurality of automatic re-routing engines corresponds to a different cloud computing environment of the plurality of cloud computing environments;

identify, by the holochain engine and based on the information, the cloud computing environment of the plurality of cloud computing environments to store the consumer data;

determine, by a validation engine, whether the consumer data satisfies validation criteria; and based on determining that the consumer data fails to satisfy the validation criteria:
request additional validation criteria;
determine whether the consumer data satisfies the additional validation criteria; and
based on determining that the consumer data fails to satisfy the additional validation criteria, transmit the consumer data to a logging engine; and based on determining that the consumer data successfully satisfies one of: the validation criteria or the additional validation criteria, transmit the consumer data to an encryption engine and a distributed hash table.

15. The one or more non-transitory computer-readable media of claim 14, wherein the information comprises at least one of:
storage availability;
a cost associated with storage;
a current storage capacity; or
a maximum storage capacity.

16. The one or more non-transitory computer-readable media of claim 14, wherein the identifying further causes the computing platform to:
compare, by the holochain engine, the information corresponding to each cloud computing environment; and
identify, by the holochain engine, the cloud computing environment of the plurality of cloud computing environments that satisfies selection criteria, wherein the selection criteria comprises at least one of:

a budget for purchasing storage within the cloud computing environment; or an amount of storage needed to store the consumer data.

17. The one or more non-transitory computer-readable media of claim 14, wherein the instructions, when executed, further cause the computing platform to:

analyze, by the logging engine, the consumer data and failed validation criteria;

identify, by the logging engine, a consumer device associated with the consumer data; and determine, based on the analyzing, whether the consumer should be blocked from transmitting the consumer data to the enterprise organization.

18. The one or more non-transitory computer-readable media of claim 14, wherein the instructions, when executed, further cause the computing platform to:

generate, by the encryption engine, keys pairs comprising a public key and a private key;

encrypt, by the encryption engine, the consumer data using the public key; and transmit, by the encryption engine and to the distributed hash table, the private key and the encrypted consumer data.

19. The one or more non-transitory computer-readable media of claim 18, wherein the instructions, when executed, further cause the computing platform to store, by the distributed hash table and within the identified cloud computing environment, the encrypted consumer data.

20. The one or more non-transitory computer-readable media of claim 14, wherein the instructions, when executed, further cause the computing platform to transmit, to the enterprise organization, a notification indicating one of:

a successful validation of the consumer data; or a failed validation of the consumer data.

* * * * *